US012779395B2

(12) United States Patent
Kinoshita et al.

(10) Patent No.: US 12,779,395 B2
(45) Date of Patent: Nov. 3, 2026

(54) SEPARATION SYSTEM

(71) Applicant: NGK Insulators, Ltd., Nagoya-City (JP)

(72) Inventors: Naoto Kinoshita, Nagoya-City (JP); Kenichi Noda, Nagoya-City (JP)

(73) Assignee: NGK INSULATORS, LTD., Nagoya-City (JP)

( * ) Notice: Subject to any disclaimer, the term of this patent is extended or adjusted under 35 U.S.C. 154(b) by 761 days.

(21) Appl. No.: 18/064,345

(22) Filed: Dec. 12, 2022

(65) Prior Publication Data

US 2023/0108642 A1 Apr. 6, 2023

Related U.S. Application Data

(63) Continuation of application No. PCT/JP2021/025834, filed on Jul. 8, 2021.

(30) Foreign Application Priority Data

Jul. 13, 2020 (JP) .................................. 2020120028
Mar. 12, 2021 (WO) .................. PCT/JP2021/010219

(51) Int. Cl.
*B01D 53/22* (2006.01)
*B01D 71/02* (2006.01)

(52) U.S. Cl.
CPC ......... *B01D 53/226* (2013.01); *B01D 53/228* (2013.01); *B01D 71/02* (2013.01);
(Continued)

(58) Field of Classification Search
CPC . B01D 53/226; B01D 71/028; B01D 2311/14
(Continued)

(56) References Cited

U.S. PATENT DOCUMENTS 9,770,687 B2 * 9/2017 Ungerank .............. B01D 53/22
2010/0074820 A1 3/2010 Kimoto et al.
(Continued)

FOREIGN PATENT DOCUMENTS

CA 2940331 A1 * 3/2017 ........... B01D 53/229
CA 2940331 C * 6/2018 ............. F25J 3/0665
(Continued)

OTHER PUBLICATIONS

Himeno, S. et al. Synthesis and Permeation Properties of a DDR-Type Zeolite Membrane for Separation of CO2/CH4 Gaseous Mixtures, Industrial & Engineering Chemistry Research, vol. 46 (Sep. 13, 2007), pp. 6989-6997 (Year: 2007).*
(Continued)

*Primary Examiner* — Jennifer Dieterle
*Assistant Examiner* — Rachel Marie Slaugovsky
(74) *Attorney, Agent, or Firm* — Muncy, Geissler, Olds & Lowe, P.C.

(57) ABSTRACT

A separation system includes first and second separation parts each having a separation membrane and provided with a fluid supply port, a permeate fluid exhaust port, and a non-permeate fluid exhaust port, an intermediate connecting part for connecting the permeate fluid exhaust port of the first separation part and the fluid supply port of the second separation part, a supply pipe connected to the fluid supply port of the first separation part, in which a mixed fluid flows at a pressure higher than an atmospheric pressure, and a pressure reducing part connected to the permeate fluid exhaust port of the second separation part, for reducing a pressure inside the permeate fluid exhaust port to a pressure lower than the atmospheric pressure. A pressure inside the intermediate connecting part is lower than a pressure inside the supply pipe and not lower than the atmospheric pressure.

13 Claims, 11 Drawing Sheets

(52) U.S. Cl.
CPC .... *B01D 71/0281* (2022.08); *B01D 2257/504* (2013.01); *B01D 2311/14* (2013.01); *B01D 2313/22* (2013.01); *B01D 2313/24* (2013.01); *B01D 2313/246* (2013.01); *B01D 2315/10* (2013.01); *B01D 2317/025* (2013.01)

(58) Field of Classification Search
USPC .................................................. 96/142; 95/45
See application file for complete search history.

(56) References Cited

U.S. PATENT DOCUMENTS

| | | | | |
|---|---|---|---|---|
| 2013/0333354 | A1 | 12/2013 | Hamad | |
| 2017/0189862 | A1 | 7/2017 | Imasaka et al. | |
| 2017/0368497 | A1* | 12/2017 | Priske | B01D 53/226 |
| 2018/0280866 | A1* | 10/2018 | Hasegawa | B01D 53/1475 |
| 2018/0339264 | A1* | 11/2018 | Fukuda | B01D 53/226 |
| 2019/0321780 | A1* | 10/2019 | Bikson | B01D 53/0407 |
| 2020/0254383 | A1* | 8/2020 | Roodbeen | B01D 53/227 |

FOREIGN PATENT DOCUMENTS

| | | | | |
|---|---|---|---|---|
| CN | 106573204 | A | | 4/2017 |
| CN | 210134073 | U | * | 3/2020 |
| CN | 210915955 | U | | 7/2020 |
| JP | H07-047222 | A | | 2/1995 |
| JP | 2008-137847 | A | | 6/2008 |
| JP | 4879795 | B2 | | 2/2012 |
| JP | 2012-236123 | A | | 12/2012 |
| JP | 2013-095726 | A | | 5/2013 |
| JP | 2013-255898 | A | | 12/2013 |
| JP | 2014-508240 | A | | 4/2014 |
| JP | 5948853 | B2 | | 7/2016 |
| JP | 2017-177089 | A | | 10/2017 |
| JP | 2018-511472 | A | | 4/2018 |
| JP | 2018-171596 | A | | 11/2018 |
| JP | 6435961 | B2 | | 12/2018 |
| JP | 6553739 | B2 | | 7/2019 |
| JP | 2020-032330 | A | | 3/2020 |

OTHER PUBLICATIONS

International Search Report and Written Opinion (Application No. PCT/JP2021/025834) dated Sep. 14, 2021.

English translation of the International Preliminary Report on Patentability (Chapter I) dated Jan. 26, 2023 (Application No. PCT/JP2021/025834).

Amended Claims Statement (Application No. PCT/JP2021/025834) dated Oct. 27, 2021 (with English translation).

Chinese Office Action (with English translation) dated May 27, 2025 (Application No. 202180045718.0).

Chinese Second Office Action (Application No. 202180045718.0) dated Nov. 7, 2025 (with English translation) (28 pages).

* cited by examiner

SEPARATION SYSTEM

CROSS-REFERENCE TO RELATED APPLICATIONS

The present application is a continuation application of International Application No. PCT/JP2021/025834 filed on Jul. 8, 2021, which claims priority to Japanese Patent Application No. 2020-120028 filed on Jul. 13, 2020 and International Application No. PCT/JP2021/010219 filed on Mar. 12, 2021. The contents of these applications are incorporated herein by reference in their entirety.

TECHNICAL FIELD

The present invention relates to a separation system.

BACKGROUND ART

As a separation method of a mixed fluid composed of liquids, gases, vapors, or the like, a distillation method, a chemical absorption method, a physical absorption method, an adsorption method, a membrane separation method, or the like is used, and attention is paid to the membrane separation method among these methods, which has advantages of simple and compact system configuration therefor, easy maintenance, low consumption energy, and the like. Separation of a mixed fluid by the membrane separation method has become practical in various uses such as dehydration in a bioethanol purification process, $CO_2$ removal in a natural gas purification process or a biogas purification process, and the like.

In the Paris Agreement adopted in COP21 held in 2015, as to prevention of global warming, set was the aim to hold the increase in the global average temperature during this century to well below 2° C. above pre-industrial levels and pursue efforts to limit the temperature increase to 1.5° C. above pre-industrial levels, and in order to achieve this aim, activities as to CCS (Carbon dioxide Capture and Storage) and CCUS (Carbon dioxide Capture, Utilization and Storage) have been actively performed worldwide. In the CCS or the CCUS, a process of collecting $CO_2$ is very important and it becomes a key for spreading the CCS and the CCUS to collect high purity $CO_2$ at low cost.

In recent years, for the purpose of use in the CCS and the CCUS, performed is application examination or the like of a separation membrane for separation and collection of $CO_2$ in natural gas purification and separation and collection of $CO_2$ from an exhaust gas of a thermal power station, a plant, or an internal combustion engine in a moving means such as an automobile or the like.

In the membrane separation method, a partial pressure difference of a fluid component between a supply side and a permeate side of a separation membrane becomes a driving force, and generally pressure rising on the supply side of the separation membrane, pressure reduction on the permeate side thereof, or the like is performed except in the case where a mixed fluid originally having a high pressure is supplied to the separation membrane (see, for example, Patent Publication No. 6435961 (Document 1), Japanese Patent Application Laid Open Gazette No. 2020-32330 (Document 2), Japanese Patent Application Laid Open Gazette No. 2012-236123 (Document 3), and Japanese Patent Application Laid Open Gazette No. 2008-137847 (Document 4)). Further, in Patent Publication No. 6553739 (Document 5), disclosed is a method of ensuring a driving force by carrying water vapor sweep gas to the permeate side of the separation membrane.

Further, since the separation accuracy of a separation system using the membrane separation method basically depends on a material and a structure of the separation membrane, a structure of a separation membrane module, or the like, development of separation membranes and separation membrane modules has been actively performed, and efforts to maximally improve the separation accuracy of the separation system have been made by devising the configuration of the separation system. In Documents 1 to 5, for example, proposed is a separation system for supplying a fluid permeating a separation membrane module to another separation membrane module. In Documents 1 to 5, also proposed are methods of providing compressors at a plurality of portions to raise a pressure of a supply fluid, performing pressure rising on a supply side and pressure reduction on a permeate side in one separation membrane module at the same time, returning a fluid permeating a separation membrane to a supply side again, and the like.

In the above-described separation system, it is possible to improve the separation accuracy to some degree, but there are still problems that the separation accuracy is still insufficient, that the configuration of the separation system disadvantageously becomes complicated, and that consumption energy becomes significantly high.

SUMMARY OF THE INVENTION

The present invention is intended for a separation system, and it is an object of the present invention to improve separation accuracy by using a simple structure capable of suppressing consumption energy in the separation system.

The separation system according to the present invention includes a first separation part having a separation membrane and provided with a fluid supply port, a permeate fluid exhaust port, and a non-permeate fluid exhaust port, a second separation part having a separation membrane and provided with a fluid supply port, a permeate fluid exhaust port, and a non-permeate fluid exhaust port, an intermediate connecting part for connecting the permeate fluid exhaust port of the first separation part and the fluid supply port of the second separation part, a supply pipe connected to the fluid supply port of the first separation part, in which a mixed fluid containing a plurality of types of fluids flows at a pressure higher than an atmospheric pressure, and a pressure reducing part connected to the permeate fluid exhaust port of the second separation part, for reducing a pressure inside the permeate fluid exhaust port to a pressure lower than the atmospheric pressure. In the separation system, the intermediate connecting part is not provided with any device for pressure rising nor any device for pressure reduction, and a pressure inside the intermediate connecting part is lower than a pressure inside the supply pipe and not lower than the atmospheric pressure.

According to the present invention, it is possible to improve separation accuracy by using a simple structure capable of suppressing consumption energy in the separation system.

Preferably, a pressure difference between the fluid supply port and the permeate fluid exhaust port in the second separation part is not higher than 0.8 times the pressure difference in the first separation part.

Preferably, the mixed fluid is a mixed gas containing a plurality of types of gases.

Preferably, the separation system further includes a condensation prevention part provided at a predetermined position on a path from the supply pipe to the separation membrane of the second separation part, for heating or keeping warm a gas flowing in the path, to thereby prevent condensation of the gas.

Preferably, the separation system further includes a preprocessing part provided at a predetermined position between a supply source of the mixed fluid and the first separation part, for removing at least part of a predetermined component contained in the mixed fluid.

Preferably, the separation membrane of the first separation part and/or the separation membrane of the second separation part each contain an inorganic material.

Preferably, the separation membrane of the first separation part and/or the separation membrane of the second separation part are each a zeolite membrane.

Preferably, the mixed fluid contains a fluid having a molecular size smaller than a pore diameter of zeolite forming the zeolite membrane and a fluid having a molecular size larger than the pore diameter.

Preferably, a zeolite forming the zeolite membrane is an eight-membered ring zeolite.

Preferably, the separation system further includes a pressure adjustment part for adjusting a pressure inside the permeate fluid exhaust port or the non-permeate fluid exhaust port of the second separation part so that a flow rate and/or component composition of a fluid exhausted from the permeate fluid exhaust port or the non-permeate fluid exhaust port of the second separation part can fall within a predetermined range.

Preferably, the separation system further includes a return pipe for leading part of a fluid exhausted from the non-permeate fluid exhaust port of the first separation part and/or at least part of a fluid exhausted from the non-permeate fluid exhaust port of the second separation part to the fluid supply port of the first separation part.

Preferably, the separation system further includes an energy conversion part for converting pressure energy of a fluid exhausted from the non-permeate fluid exhaust port of the first separation part into different energy.

Preferably, the separation system further includes an exhaust fluid pressure rising part for raising a pressure of a fluid exhausted from the non-permeate fluid exhaust port of the second separation part. The fluid whose pressure is raised by the exhaust fluid pressure rising part is mixed with a fluid exhausted from the non-permeate fluid exhaust port of the first separation part.

These and other objects, features, aspects and advantages of the present invention will become more apparent from the following detailed description of the present invention when taken in conjunction with the accompanying drawings.

DETAILED DESCRIPTION

Figure 1:
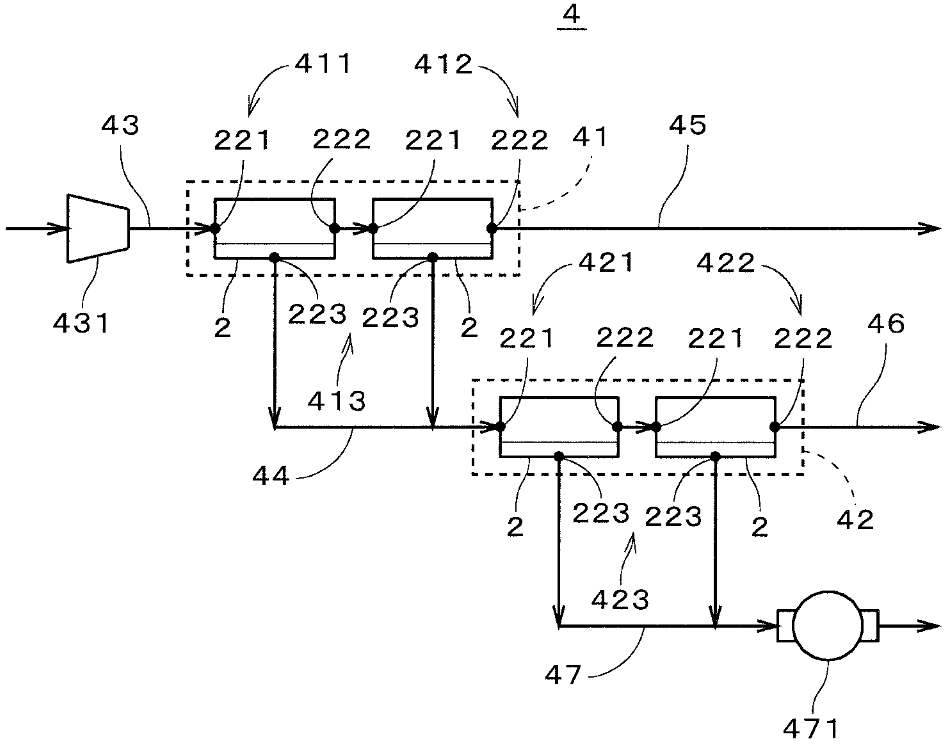
FIG. 1 is a view showing a configuration of a separation system.

FIG. 1 is a view showing a configuration of a separation system 4 in accordance with one preferred embodiment of the present invention. The separation system 4 is a system for separating a fluid having high permeability to a separation membrane complex 1 described later from a mixed fluid containing a plurality of types of fluids (i.e., gases or liquids). Separation in the separation system 4 may be performed, for example, in order to extract a fluid with high permeability from a mixed fluid, or in order to concentrate a fluid with low permeability.

The mixed fluid may be a mixed gas containing a plurality of types of gases (including vapors), may be a mixed liquid containing a plurality of types of liquids, or may be a gas-liquid two-phase fluid containing both a gas and a liquid. The mixed fluid may contain a slight amount of solids such as particles or the like.

The mixed fluid contains at least one of, for example, hydrogen ($H_2$), helium (He), nitrogen ($N_2$), oxygen ($O_2$), water ($H_2O$), water vapor ($H_2O$), carbon monoxide (CO), carbon dioxide ($CO_2$), nitrogen oxide, ammonia ($NH_3$), sulfur oxide, hydrogen sulfide ($H_2S$), sulfur fluoride, mercury (Hg), arsine ($AsH_3$), hydrogen cyanide (HCN), carbonyl sulfide (COS), C1 to C8 hydrocarbons, organic acid, alcohol, mercaptans, ester, ether, ketone, and aldehyde.

The nitrogen oxide is a compound of nitrogen and oxygen. The above-described nitrogen oxide is, for example, a gas called NOx such as nitric oxide (NO), nitrogen dioxide ($NO_2$), nitrous oxide (also referred to as dinitrogen monoxide) ($N_2O$), dinitrogen trioxide ($N_2O_3$), dinitrogen tetroxide ($N_2O_4$), dinitrogen pentoxide ($N_2O_5$), or the like.

The sulfur oxide is a compound of sulfur and oxygen. The above-described sulfur oxide is, for example, a gas called $SO_X$ such as sulfur dioxide ($SO_2$), sulfur trioxide ($SO_3$), or the like.

The sulfur fluoride is a compound of fluorine and sulfur. The above-described sulfur fluoride is, for example, disulfur difluoride (F—S—S—F, S═$SF_2$), sulfur difluoride ($SF_2$), sulfur tetrafluoride ($SF_4$), sulfur hexafluoride ($SF_6$), disulfur decafluoride ($S_2F_{10}$), or the like.

The C1 to C8 hydrocarbons are hydrocarbons with not less than 1 and not more than 8 carbon atoms. The C3 to C8 hydrocarbons may be any one of a linear-chain compound, a side-chain compound, and a ring compound. Further, the C2 to C8 hydrocarbons may either be a saturated hydrocarbon (i.e., in which there is no double bond nor triple bond in a molecule), or an unsaturated hydrocarbon (i.e., in which there is a double bond and/or a triple bond in a molecule). The C1 to C4 hydrocarbons are, for example, methane ($CH_4$), ethane ($C_2H_6$), ethylene ($C_2H_4$), propane ($C_3H_8$), propylene ($C_3H_6$), normal butane ($CH_3(CH_2)_2CH_3$), isobutane ($CH(CH_3)_3$), 1-butene ($CH_2{=}CHCH_2CH_3$), 2-butene ($CH_3CH{=}CHCH_3$), or isobutene ($CH_2{=}C(CH_3)_2$).

The above-described organic acid is carboxylic acid, sulfonic acid, or the like. The carboxylic acid is, for example, formic acid ($CH_2O_2$), acetic acid ($C_2H_4O_2$), oxalic acid ($C_2H_2O_4$), acrylic acid ($C_3H_4O_2$), benzoic acid ($C_6H_5COOH$), or the like. The sulfonic acid is, for example, ethanesulfonic acid ($C_2H_6O_3S$) or the like. The organic acid may either be a chain compound or a ring compound.

The above-described alcohol is, for example, methanol ($CH_3OH$), ethanol ($C_2H_5OH$), isopropanol (2-propanol) ($CH_3CH(OH)CH_3$), ethylene glycol ($CH_2(OH)CH_2(OH)$), butanol ($C_4H_9OH$), or the like.

The mercaptans are an organic compound having hydrogenated sulfur (SH) at the terminal end thereof, and are a substance also referred to as thiol or thioalcohol. The above-described mercaptans are, for example, methyl mercaptan ($CH_3SH$), ethyl mercaptan ($C_2H_5SH$), 1-propanethiol ($C_3H_7SH$), or the like.

The above-described ester is, for example, formic acid ester, acetic acid ester, or the like.

The above-described ether is, for example, dimethyl ether ($(CH_3)_2O$), methyl ethyl ether ($C_2H_5OCH_3$), diethyl ether ($(C_2H_5)_2O$), or the like.

The above-described ketone is, for example, acetone ($(CH_3)_2CO$), methyl ethyl ketone ($C_2H_5COCH_3$), diethyl ketone ($(C_2H_5)_2CO$), or the like.

The above-described aldehyde is, for example, acetaldehyde ($CH_3CHO$), propionaldehyde ($C_2H_5CHO$), butanal (butylaldehyde) ($C_3H_7CHO$), or the like.

In the following description, it is assumed that the mixed fluid to be separated by the separation system 4 is a mixed gas containing a plurality of types of gases. The mixed gas may contain particles, droplets, or the like as impurities.

The separation system 4 shown in FIG. 1 includes a first separation part 41 and a second separation part 42. The first separation part 41 has one or more separation membrane modules 2. The second separation part 42 also has one or more separation membrane modules 2. In the present preferred embodiment, each of the separation parts 41 and 42 has a plurality of separation membrane modules 2. In FIG. 1, the plurality of separation membrane modules 2 included in each of the separation parts 41 and 42 are surrounded by a broken-line rectangle. Hereinafter, the separation membrane module 2 will be described in detail.

Figure 2:
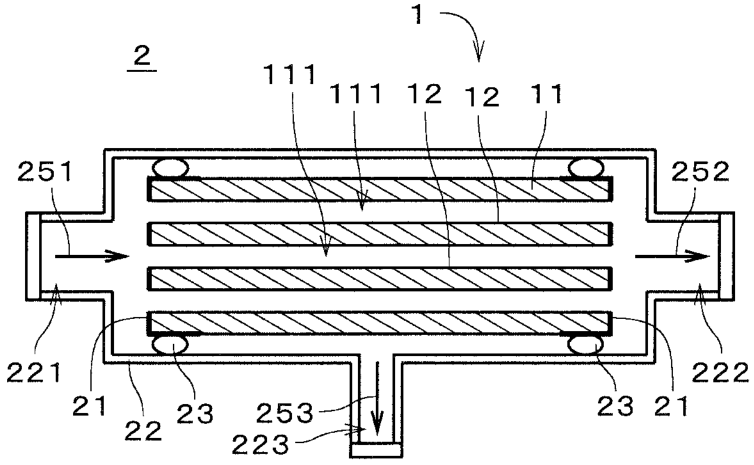
FIG. 2 is a view showing a schematic structure of a separation membrane module.

FIG. 2 is a view showing a schematic structure of one separation membrane module 2. In FIG. 2, parallel hatch lines in a cross section of a partial structure are omitted. The separation membrane module 2 includes a separation membrane complex 1, two sealing parts 21, a housing 22, and two sealing members 23. The separation membrane complex 1, the sealing parts 21, and the sealing members 23 are housed in the housing 22.

Figure 3:
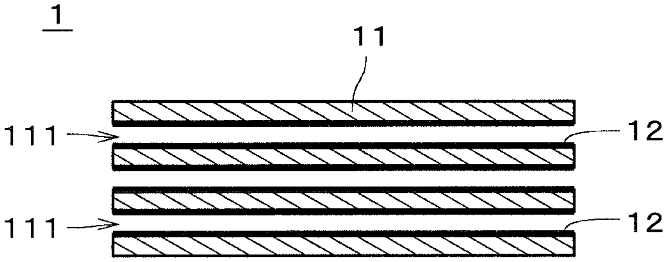
FIG. 3 is a cross section of a separation membrane complex.
Figure 4:
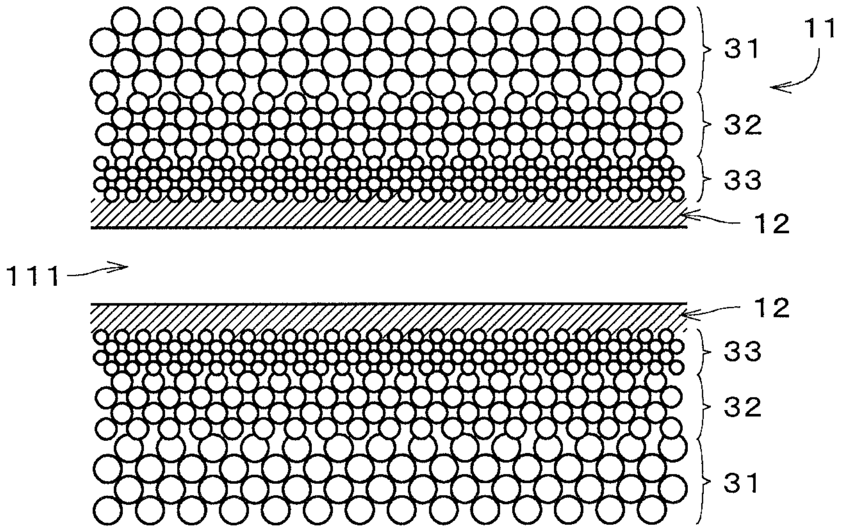
FIG. 4 is a cross section showing part of the separation membrane complex in enlarged dimension.

FIG. 3 is a cross section of the separation membrane complex 1. FIG. 4 is a cross section showing part of the separation membrane complex 1 in enlarged dimension. The separation membrane complex 1 includes a porous support 11 and a zeolite membrane 12 which is a separation membrane formed on the support 11. The zeolite membrane 12 is at least obtained by forming a zeolite on a surface of the support 11 in a membrane form and does not include a membrane obtained by simply dispersing zeolite particles in an organic membrane. The zeolite membrane 12 may contain two or more types of zeolites which are different in the structure and the composition. In FIG. 3, the zeolite membrane 12 is represented by a thick line. In FIG. 4, the zeolite membrane 12 is hatched. Further, in FIG. 4, the thickness of the zeolite membrane 12 is shown larger than the actual thickness. Furthermore, in the separation membrane complex 1, a separation membrane other than the zeolite membrane 12 may be provided.

The support 11 is a porous member that gas and liquid can permeate. In the exemplary case shown in FIG. 3, the support 11 is a monolith-type support having an integrally and continuously molded columnar main body provided with a plurality of through holes 111 each extending in a longitudinal direction (i.e., a left and right direction in FIG. 3). In the exemplary case shown in FIG. 3, the support 11 has a substantially columnar shape. A cross section perpendicular to the longitudinal direction of each of the through holes 111 (i.e., cells) is, for example, substantially circular. In FIG. 3, the diameter of each through hole 111 is larger than the actual diameter, and the number of through holes 111 is smaller than the actual number. The zeolite membrane 12 is formed over an inner surface of the through hole 111, covering substantially the entire inner surface of the through hole 111.

The length of the support 11 (i.e., the length in the left and right direction of FIG. 3) is, for example, 10 cm to 200 cm. The outer diameter of the support 11 is, for example, 0.5 cm to 30 cm. The distance between the central axes of adjacent through holes 111 is, for example, 0.3 mm to 10 mm. The surface roughness (Ra) of the support 11 is, for example, 0.1 μm to 5.0 μm, and preferably 0.2 μm to 2.0 μm. Further, the shape of the support 11 may be, for example, honeycomb-like, flat plate-like, tubular, cylindrical, columnar, polygonal prismatic, or the like. When the support 11 has a tubular or cylindrical shape, the thickness of the support 11 is, for example, 0.1 mm to 10 mm.

As the material for the support 11, various materials (for example, ceramics or a metal) may be adopted only if the materials ensure chemical stability in the process step of forming the zeolite membranes 12 on the surface thereof. In the present preferred embodiment, the support 11 is formed of a ceramic sintered body. Examples of the ceramic sintered body which is selected as a material for the support 11 include alumina, silica, mullite, zirconia, titania, yttria, silicon nitride, silicon carbide, and the like. In the present preferred embodiment, the support 11 contains at least one type of alumina, silica, and mullite.

The support 11 may contain an inorganic binder. As the inorganic binder, at least one of titania, mullite, easily sinterable alumina, silica, glass frit, a clay mineral, and easily sinterable cordierite can be used.

The average pore diameter of the support 11 is, for example, 0.01 μm to 70 μm, and preferably 0.05 μm to 25 μm. The average pore diameter of the support 11 in the vicinity of the surface on which the zeolite membrane 12 is formed is 0.01 μm to 1 μm, and preferably 0.05 μm to 0.5 μm. The average pore diameter can be measured by using, for example, a mercury porosimeter, a perm porometer, or a nano-perm porometer. Regarding the pore diameter distribution of the entire support 11 including the surface and the inside thereof, D5 is, for example, 0.01 μm to 50 μm, D50 is, for example, 0.05 μm to 70 μm, and D95 is, for example, 0.1 μm to 2000 μm. The porosity of the support 11 in the vicinity of the surface on which the zeolite membrane 12 is formed is, for example, 20% to 60%.

The support 11 has, for example, a multilayer structure in which a plurality of layers with different average pore diameters are layered in a thickness direction. In the exemplary case shown in FIG. 4, the support 11 has a base material 31, an intermediate layer 32, and a surface layer 33. The average pore diameter and the sintered particle diameter in the surface layer 33 including the surface on which the zeolite membrane 12 is formed are smaller than those in the layers (the base material 31 and the intermediate layer 32) other than the surface layer 33. The average pore diameter in the surface layer 33 of the support 11 is, for example, 0.01 μm to 1 μm, and preferably 0.05 μm to 0.5 μm. When the support 11 has a multilayer structure, the materials for the respective layers can be those described above. The materials for the plurality of layers constituting the multilayer structure may be the same as or different from one another. In the support 11, a plurality of intermediate layers 32 having respective average pore diameters or the like which are different from one another may be layered between the base material 31 and the surface layer 33. Further, in the support 11, the surface layer 33 or the intermediate layer 32 may be omitted, or both the surface layer 33 and the intermediate layer 32 may be omitted.

The zeolite membrane 12 is a porous membrane having micropores. The zeolite membrane 12 can be used as a separation membrane for separating a specific substance from a mixed substance in which a plurality of types of substances are mixed, by using a molecular sieving function. As compared with the specific substance, any one of the other substances is harder to permeate the zeolite membrane 12. In other words, the permeance of any other substance through the zeolite membrane 12 is smaller than that of the above specific substance.

The thickness of the zeolite membrane 12 is, for example, 0.05 μm to 30 μm, preferably 0.1 μm to 20 μm, and more preferably 0.5 μm to 10 μm. When the thickness of the zeolite membrane 12 is increased, the separation performance increases. When the thickness of the zeolite membrane 12 is reduced, the permeance increases. The surface roughness (Ra) of the zeolite membrane 12 is, for example, 5 μm or less, preferably 2 μm or less, more preferably 1 μm or less, and further preferably 0.5 μm or less.

The pore diameter of a zeolite crystal contained in the zeolite membrane 12 (hereinafter, also referred to simply as "the pore diameter of the zeolite membrane 12") is not smaller than 0.2 nm and not larger than 0.8 nm, preferably not smaller than 0.3 nm and not larger than 0.7 nm, and more preferably not smaller than 0.3 nm and not larger than 0.45 nm. When the pore diameter of the zeolite membrane 12 is smaller than 0.2 nm, there are some cases where the amount of substance permeating the zeolite membrane becomes smaller, and when the pore diameter of the zeolite membrane 12 is larger than 0.8 nm, there are some cases where the selectivity of a substance by the zeolite membrane becomes insufficient. The pore diameter of the zeolite membrane 12 refers to a diameter (i.e., a short diameter) of the pore in a direction substantially perpendicular to the maximum diameter (i.e., a long diameter which is the maximum value of a distance between oxygen atoms) of the pore of a zeolite crystal forming the zeolite membrane 12. The pore diameter of the zeolite membrane 12 is smaller than the average pore diameter in the surface of the support 11 on which the zeolite membrane 12 is arranged.

When the maximum number of membered rings of the zeolite forming the zeolite membrane 12 is n, the short diameter of an n-membered ring pore is defined as the pore diameter of the zeolite membrane 12. Further, when the zeolite has a plurality of types of n-membered ring pores having the same n, the short diameter of the n-membered ring pore having the largest short diameter is defined as the pore diameter of the zeolite membrane 12. Furthermore, an n-membered ring refers to a portion in which the number of oxygen atoms constituting a framework forming a pore is n and each oxygen atom is bonded to later-described T atoms to form a ring structure. Further, the n-membered ring refers to a portion in which a through hole (channel) is formed and does not include any portion in which no through hole is formed. The n-membered ring pore refers to a pore formed of an n-membered ring. In terms of improvement of selectivity, it is preferable that the maximum number of membered rings of the zeolite contained in the zeolite membrane 12 described above should be eight. In other words, it is preferable that the zeolite forming the zeolite membrane 12 should be an 8-membered ring zeolite.

The pore diameter of the zeolite membrane is uniquely determined depending on the framework structure of the zeolite and can be obtained from values disclosed in "Database of Zeolite Structures" [online], internet <URL: http://www.iza-structure.org/databases/> of the International Zeolite Association.

There is no particular limitation on the type of the zeolite forming the zeolite membrane 12, but the zeolite membrane 12 may be formed of, for example, AEI-type, AEN-type, AFN-type, AFV-type, AFX-type, BEA-type, CHA-type, DDR-type, ERI-type, ETL-type, FAU-type (X-type, Y-type), GIS-type, IHW-type, LEV-type, LTA-type, LTJ-type, MEL-type, MFI-type, MOR-type, PAU-type, RHO-type, SOD-type, SAT-type zeolite, or the like. In the case where the zeolite is an eight-membered ring zeolite, for example, the zeolite may be AEI-type, AFN-type, AFV-type, AFX-type, CHA-type, DDR-type, ERI-type, ETL-type, GIS-type, IHW-type, LEV-type, LTA-type, LTJ-type, RHO-type, SAT-type zeolite, or the like. In the present preferred embodiment, the type of the zeolite forming the zeolite membrane 12 is DDR-type zeolite.

The zeolite membrane 12 contains, for example, silicon (Si). The zeolite membrane 12 may contain, for example, any two or more of Si, aluminum (Al), and phosphorus (P). As the zeolite forming the zeolite membrane 12, a zeolite in which atoms (T-atoms) located at the center of an oxygen tetrahedron ($TO_4$) constituting the zeolite include only Si or Si and Al, an AlPO-type zeolite in which T-atoms include Al and P, an SAPO-type zeolite in which T-atoms include Si, Al, and P, an MAPSO-type zeolite in which T-atoms include magnesium (Mg), Si, Al, and P, a ZnAPSO-type zeolite in which T-atoms include zinc (Zn), Si, Al, and P, or the like can be used. Some of the T-atoms may be replaced by other elements.

When the zeolite membrane 12 contains Si atoms and Al atoms, the ratio of Si/Al in the zeolite membrane 12 is, for example, not less than 1 and not more than 100,000. The Si/Al ratio is a molar ratio of Si element to Al element contained in zeolite membrane 12. The Si/Al ratio is preferably 5 or more, more preferably 20 or more, and further preferably 100 or more. In short, the higher the ratio is, the better. By adjusting the mixing ratio of an Si source and an Al source in a starting material solution used in the manufacture of the zeolite membrane 12, or the like, it is possible to adjust the Si/Al ratio in the zeolite membrane 12. The zeolite membrane 12 may contain an alkali metal. The alkali metal is, for example, sodium (Na) or potassium (K).

The ratio (permeance ratio) of the permeance of $CO_2$ through the zeolite membrane 12 to the permeance of $N_2$ therethrough is, for example, not lower than 5, preferably not lower than 10, more preferably not lower than 15, and further preferably not lower than 25. The permeance ratio is a ratio in a case where a single-component cylinder gas is used as a supply gas and the pressure on the supply side is 300 kPaG, the pressure on the permeate side is an atmospheric pressure, and the temperature is 25° C.

As shown in FIG. 2, the two sealing parts 21 in the separation membrane module 2 are members which are attached to both end portions of the support 11 in the longitudinal direction (i.e., in the left and right direction of FIG. 2) and cover and seal both end surfaces of the support 11 in the longitudinal direction and portions of the outer peripheral surface in the vicinity of both the end surfaces. The sealing part 21 prevents inflow and outflow of a gas and a liquid from/to both the end surfaces of the support 11. Each of the sealing parts 21 is a plate-like or membrane-like member formed of, for example, glass or a resin. The material and the shape of the sealing part 21 may be changed as appropriate. Further, since the sealing part 21 is provided with a plurality of openings overlapping the plurality of through holes 111 of the support 11, both ends of each through hole 111 of the support 11 in the longitudinal direction are not covered with the sealing parts 21. Therefore, the inflow and outflow of a gas and a liquid to/from the through hole 111 from/to both the ends thereof can be made.

There is no particular limitation on the shape of the housing 22, but the housing 22 is, for example, a tubular member having a substantially cylindrical shape. The housing 22 is formed of, for example, stainless steel or carbon steel. The longitudinal direction of the housing 22 is substantially in parallel with the longitudinal direction of the zeolite membrane complex 1. A supply port 221 is provided at an end portion on one side in the longitudinal direction of the housing 22 (i.e., an end portion on the left side in FIG. 2), and a first exhaust port 222 is provided at another end portion on the other side. A second exhaust port 223 is provided on a side surface of the housing 22. An internal space of the housing 22 is a sealed space that is isolated from the space around the housing 22.

The two sealing members 23 are arranged around the entire circumference between an outer peripheral surface of the zeolite membrane complex 1 and an inner peripheral surface of the housing 22 in the vicinity of both end portions of the zeolite membrane complex 1 in the longitudinal direction. Each of the sealing members 23 is a substantially annular member formed of a material that gas and liquid cannot permeate. The sealing member 23 is, for example, an O-ring formed of a flexible resin. The sealing members 23 come into close contact with the outer peripheral surface of the zeolite membrane complex 1 and the inner peripheral surface of the housing 22 around the entire circumferences thereof. In the exemplary case shown in FIG. 2, the sealing members 23 come into close contact with an outer peripheral surface of the sealing part 21 and indirectly come into close contact with the outer peripheral surface of the separation membrane complex 1 with the sealing part 21 interposed therebetween. The portions between the sealing members 23 and the outer peripheral surface of the zeolite membrane complex 1 and between the sealing members 23 and the inner peripheral surface of the housing 22 are sealed, and it is thereby mostly or completely impossible for gas and liquid to pass through the portions.

In the separation membrane module 2, a mixed fluid (herein, mixed gas) containing a plurality of types of fluids having different permeabilities to the zeolite membrane 12 is supplied into the inside of the housing 22 as indicated by an arrow 251. For example, a main component of the mixed fluid includes $CO_2$ gas and $N_2$ gas. The mixed fluid may contain any substance other than $CO_2$ and $N_2$. The mixed fluid supplied to the housing 22 is fed from the left end of the zeolite membrane complex 1 in this figure into the inside of each through hole 111 of the support 11. A fluid with high permeability (which is, for example, $CO_2$ gas, and hereinafter is referred to as a "high permeability fluid") in the mixed fluid permeates the zeolite membrane 12 provided on the inner surface of each through hole 111 and the support 11, and is led out from the outer peripheral surface of the support 11. The high permeability fluid is thereby separated from a fluid with low permeability (which is, for example, $N_2$ gas, and hereinafter is referred to as a "low permeability fluid") in the mixed fluid.

The fluid (hereinafter, referred to as a "permeate fluid") which has permeated the zeolite membrane complex 1 and has been led out from the outer peripheral surface of the support 11 is exhausted from the housing 22 through the second exhaust port 223 as indicated by an arrow 253. The permeate fluid may include the low permeability fluid permeating the zeolite membrane 12, as well as the above-described high permeability fluid.

Further, in the mixed fluid, a fluid (hereinafter, referred to as a "non-permeate fluid") other than the fluid which has permeated the zeolite membrane 12 and the support 11 passes through each through hole 111 of the support 11 from the left side to the right side in this figure. The non-permeate fluid is exhausted from the housing 22 though the first exhaust port 222 as indicated by an arrow 252. A pressure of the non-permeate fluid to be exhausted from the housing 22 is, for example, substantially the same as the pressure (feed pressure) of the fluid to be fed into the inside of the housing 22. The non-permeate fluid may include the high permeability fluid that has not permeated the zeolite membrane 12, as well as the above-described low permeability fluid.

As described earlier, each separation part 41 or 42 shown in FIG. 1 may have a plurality of separation membrane modules 2. In a case, for example, where the separation part 41 or 42 includes M separation membrane modules 2, i.e., the first separation membrane module 2 to the M-th separation membrane module 2 (M is an integer not smaller than 2), the first exhaust port 222 of the (m−1)-th separation membrane module 2 (m is an integer not smaller than 2 and not larger than M) is connected to the supply port 221 of the m-th separation membrane module 2. The plurality of separation membrane modules 2 are thereby connected to one another in series. As described later, in each separation part 41 or 42, the fluid is supplied to the first separation membrane module 2, and the fluid not permeating the zeolite membrane 12 sequentially passes through from the first separation membrane module 2 to the M-th separation membrane module 2. Though it is assumed herein that the first separation part 41 and the second separation part 42 each include the same number (M) of separation membrane modules 2, the number of separation membrane modules 2 in the first separation part 41 may be different from the number of separation membrane modules 2 in the second separation part 42. As described later, the number of separation membrane modules 2 in each of the first separation part 41 and the second separation part 42 may be one. Further, the separation membrane module 2 in the first separation part 41 may be the same as the separation membrane module 2 in the second separation part 42, or may be different therefrom in the constitution, the shape, or the like. The first separation part 41 and the second separation part 42 may include the separation membrane modules 2 which are different from each other in the constitution, the shape, or the like.

The first separation part 41 includes a fluid supply port 411, a non-permeate fluid exhaust port 412, and a permeate fluid exhaust port 413. In the first separation part 41, the supply port 221 of the first separation membrane module 2, i.e., the separation membrane module 2 on the most upstream side serves as the fluid supply port 411. The first exhaust port 222 of the M-th separation membrane module 2, i.e., the separation membrane module 2 on the most downstream side serves as the non-permeate fluid exhaust port 412. Further, a group of M second exhaust ports 223 in the first to M-th separation membrane modules 2 serves as the permeate fluid exhaust port 413. The first separation part 41 may include only one separation membrane module 2, and in this case, the supply port 221, the first exhaust port 222, and the second exhaust port 223 of the separation membrane module 2 serve as the fluid supply port 411, the non-permeate fluid exhaust port 412, and the permeate fluid exhaust port 413, respectively.

Like the first separation part 41, the second separation part 42 includes a fluid supply port 421, a non-permeate fluid exhaust port 422, and a permeate fluid exhaust port 423. In the second separation part 42, the supply port 221 of the first separation membrane module 2, i.e., the separation membrane module 2 on the most upstream side serves as the fluid supply port 421. The first exhaust port 222 of the M-th separation membrane module 2, i.e., the separation membrane module 2 on the most downstream side serves as the non-permeate fluid exhaust port 422. Further, a group of M second exhaust ports 223 in the first to M-th separation membrane modules 2 serves as the permeate fluid exhaust port 423. The second separation part 42 may include only one separation membrane module 2, and in this case, the supply port 221, the first exhaust port 222, and the second exhaust port 223 of the separation membrane module 2 serve as the fluid supply port 421, the non-permeate fluid exhaust port 422, and the permeate fluid exhaust port 423, respectively.

The separation system 4 further includes a supply pipe 43, an intermediate connecting part 44, a first non-permeate fluid collection pipe 45, a second non-permeate fluid collection pipe 46, and a permeate fluid collection pipe 47. The supply pipe 43 is connected to the fluid supply port 411 of the first separation part 41. The supply pipe 43 is provided with a supply fluid pressure rising part 431. The intermediate connecting part 44 is a connecting pipe and connects the permeate fluid exhaust port 413 of the first separation part 41 to the fluid supply port 421 of the second separation part 42. The first non-permeate fluid collection pipe 45 is connected to the non-permeate fluid exhaust port 412 of the first separation part 41. The second non-permeate fluid collection pipe 46 is connected to the non-permeate fluid exhaust port 422 of the second separation part 42. The permeate fluid collection pipe 47 is connected to the permeate fluid exhaust port 423 of the second separation part 42. The permeate fluid collection pipe 47 is provided with a pressure reducing part 471.

Figure 5:
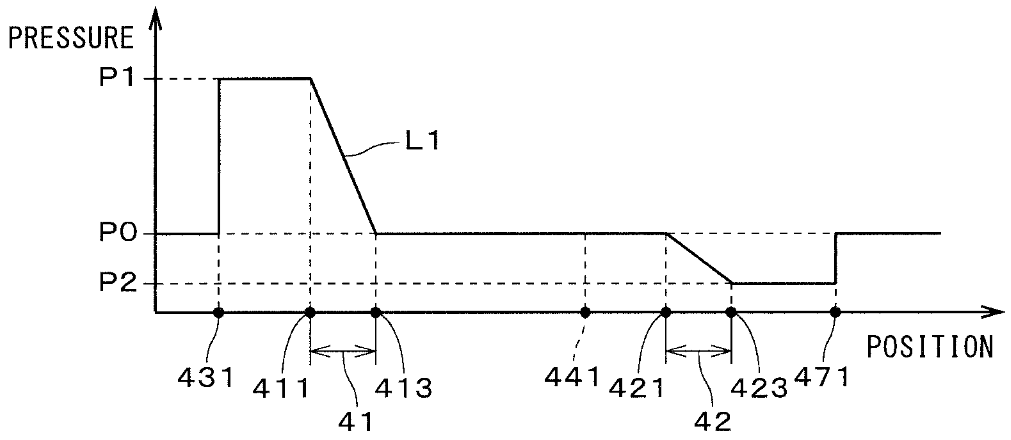
FIG. 5 is a graph showing a pressure at each position of the separation system.

FIG. 5 is a graph showing a pressure at each position of the separation system 4. The vertical axis of FIG. 5 represents a pressure and the horizontal axis thereof represents a position in a path from the supply pipe 43 to the permeate fluid collection pipe 47. On the horizontal axis of FIG. 5, respective positions of the supply fluid pressure rising part 431, the first separation part 41, the second separation part 42, and the pressure reducing part 471 are represented by the same reference signs as those of the corresponding constituent elements. A solid line L1 in FIG. 5 represents a pressure of each position of the separation system 4 shown in FIG. 1.

In the separation system 4 of FIG. 1, the mixed fluid flows into the supply pipe 43 from an external supply source of the mixed fluid. The supply fluid pressure rising part 431 is, for example, a compressor or the like and raises (compresses) a pressure of the mixed fluid. As shown in FIG. 5, the supply fluid pressure rising part 431 causes the pressure of the mixed fluid to become a pressure P1 (for example, a pressure P1 higher than 200 kPaG) which is sufficiently higher than an atmospheric pressure P0. The mixed fluid is supplied to the first separation part 41 through the fluid supply port 411. In the following description, the mixed fluid supplied to the first separation part 41 is referred to as a "supply fluid". The pressure P1 of the supply fluid (the pressure on the supply side of the first separation part 41) ranges, for example, from 200 kPaG to 10000 kPaG, preferably from 250 kPaG to 7000 kPaG, and more preferably from 300 kPaG to 4000 kPaG. The temperature of the supply fluid is, for example, 10° C. to 250° C. In the supply pipe 43, a temperature control part and a pressure regulating part for controlling the temperature and the pressure of the supply fluid, respectively, may be provided additionally to the supply fluid pressure rising part 431. When the pressure of the mixed fluid flowing from the supply source of the mixed fluid to the supply pipe 43 is sufficiently higher than the atmospheric pressure P0, the supply fluid pressure rising part 431 may be omitted.

In the first separation part 41, a fluid (hereinafter, referred to as a "first non-permeate fluid") which has not permeated the zeolite membrane 12 of any separation membrane module 2 is exhausted to the first non-permeate fluid collection pipe 45 through the non-permeate fluid exhaust port 412 and then collected. A pressure of the first non-permeate fluid (the pressure on a non-permeate side of the first separation part 41) is substantially the same as the pressure P1 of the supply fluid supplied to the first separation part 41. In the first separation part 41, a fluid (hereinafter, referred to as a "first permeate fluid") which has permeated the zeolite membrane 12 of one separation membrane module 2 is led to the intermediate connecting part 44 through the permeate fluid exhaust port 413. As described later, in the exemplary case shown in FIG. 1, a pressure inside the intermediate connecting part 44 is a substantially atmospheric pressure (actually, the atmospheric pressure P0 or a pressure slightly higher than the atmospheric pressure P0, and for example, from 0 to 50 kPaG, and preferably from 0 to 30 kPaG). In other words, a pressure of the first permeate fluid exhausted from the permeate fluid exhaust port 413 (a pressure on a permeate side of the first separation part 41) is the substantially atmospheric pressure.

The intermediate connecting part 44 is not provided with any device for pressure rising, such as a compressor or the like, nor any device for pressure reduction, such as a vacuum pump or the like, and in the exemplary case shown in FIG. 1, the pressure of the intermediate connecting part 44 on the whole is the substantially atmospheric pressure. The first permeate fluid from the first separation part 41 is supplied to the second separation part 42 through the fluid supply port 421. A pressure of the first permeate fluid supplied to the second separation part 42 (a pressure on the supply side of the second separation part 42) is the substantially atmospheric pressure.

The pressure reducing part 471 is, for example, a vacuum pump or the like, and as shown in FIG. 5, the pressure reducing part 471 reduces a pressure inside the permeate fluid exhaust port 423 of the second separation part 42 to a pressure P2 lower than the atmospheric pressure P0. Further, the pressure reducing part 471 may cool the permeate fluid or cool the permeate fluid to become condensed or solidified, to thereby reduce the pressure. The pressure P2 inside the permeate fluid exhaust port 423 (the pressure on the permeate side of the second separation part 42) is, for example, from −10 kPaG to −100 kPaG, preferably from −15 kPaG to −95 kPaG, and more preferably from −20 kPaG to −90 kPaG.

In the second separation part 42, a fluid (hereinafter, referred to as a "second permeate fluid") which has permeated the zeolite membrane 12 of one separation membrane module 2 is exhausted to the permeate fluid collection pipe 47 through the permeate fluid exhaust port 423. In the separation system 4 of FIG. 1, a pressure difference between the fluid supply port 421 and the permeate fluid exhaust port 423 in the second separation part 42 is lower than a pressure difference between the fluid supply port 411 and the permeate fluid exhaust port 413 in the first separation part 41. For example, the pressure difference in the second separation part 42 is not higher than 0.8 times the pressure difference in the first separation part 41. Thus, even when the pressure difference in the second separation part 42 is small, in the second separation part 42 having the zeolite membrane 12 as a separation membrane, it is possible to increase the concentration of the high permeability fluid in the second permeate fluid and the permeance of the second permeate fluid. The pressure difference in the second separation part 42 may be not higher than 0.6 times the pressure difference in the first separation part 41 or may be not higher than 0.5 times the pressure difference in the first separation part 41. For example, the pressure difference in the second separation part 42 is not lower than 0.1 times the pressure difference in the first separation part 41. In the permeate fluid collection pipe 47, the pressure of the second permeate fluid which has permeated the pressure reducing part 471 is, for example, substantially the same as the atmospheric pressure P0.

In the second separation part 42, a fluid (hereinafter, referred to as a "second non-permeate fluid") which has not permeated the zeolite membrane 12 of any separation membrane module 2 is exhausted to the second non-permeate fluid collection pipe 46 through the non-permeate fluid exhaust port 422 and then collected. In the separation system 4, a pressure inside the second non-permeate fluid collection pipe 46 (a pressure on the non-permeate side of the second separation part 42) is the substantially atmospheric pressure. The pressure inside the intermediate connecting part 44 thereby becomes the substantially atmospheric pressure (i.e., the atmospheric pressure P0 or a pressure slightly higher than the atmospheric pressure P0). Actually, pressures of all the portions inside the intermediate connecting part 44 are lower than the pressure inside the supply pipe 43 and not lower than the atmospheric pressure.

Next, description will be made on a separation test performed on respective separation systems in Example and Comparative Examples. The separation system 4 in Example has the same configuration as that shown in FIG. 1. FIGS. 6A to 6D are views showing respective configurations of separation systems 9*a* to 9*d* in Comparative Examples 1 to 4. In the separation system 9*a* of Comparative Example 1 shown in FIG. 6A, all the separation membrane modules 2 (see FIG. 2) are connected in series, to form one separation part 91. In other words, only the first separation part 91 is provided and no second separation part is provided. To a fluid supply port 911 of the separation part 91, connected is a supply pipe 93, and the supply pipe 93 is provided with a compressor 931. To a non-permeate fluid exhaust port 912 of the separation part 91, connected is a non-permeate fluid collection pipe 95, and to a permeate fluid exhaust port 913 thereof, connected is a permeate fluid collection pipe 97. The permeate fluid collection pipe 97 is provided with no pressure reducing part.

Figure 6A:
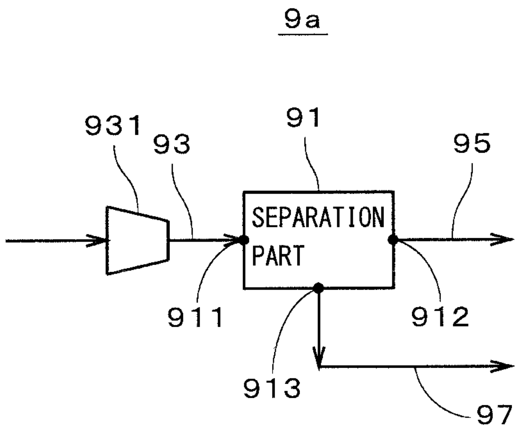
FIG. 6A is a view showing a configuration of a separation system in one Comparative Example.
Figure 6B:
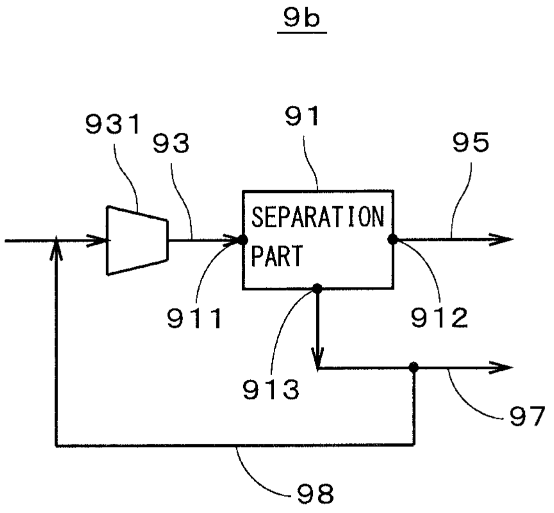
FIG. 6B is a view showing a configuration of a separation system in another Comparative Example.
Figure 6C:
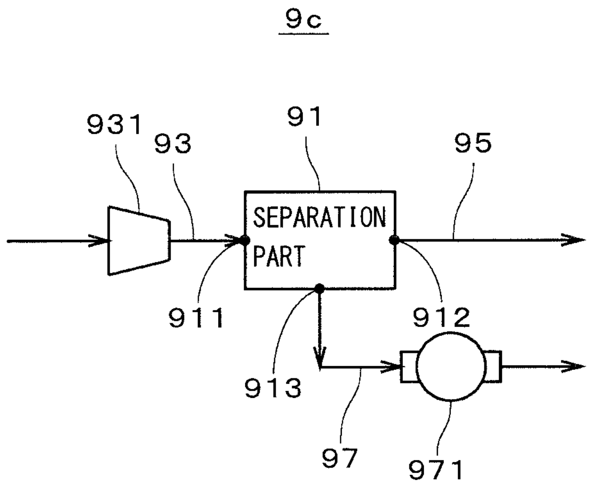
FIG. 6C is a view showing a configuration of a separation system in still another Comparative Example.

In the separation system 9*b* of Comparative Example 2 shown in FIG. 6B, a return pipe 98 is added to the separation system 9*a* of Comparative Example 1 shown in FIG. 6A. One end of the return pipe 98 is connected to the permeate fluid collection pipe 97, and the other end thereof is connected to an upstream side of the compressor 931 in the supply pipe 93. In the separation system 9*c* of Comparative Example 3 shown in FIG. 6C, a vacuum pump 971 is added to the separation system 9*a* of Comparative Example 1 shown in FIG. 6A. The vacuum pump 971 is provided in the permeate fluid collection pipe 97.

Figure 6D:
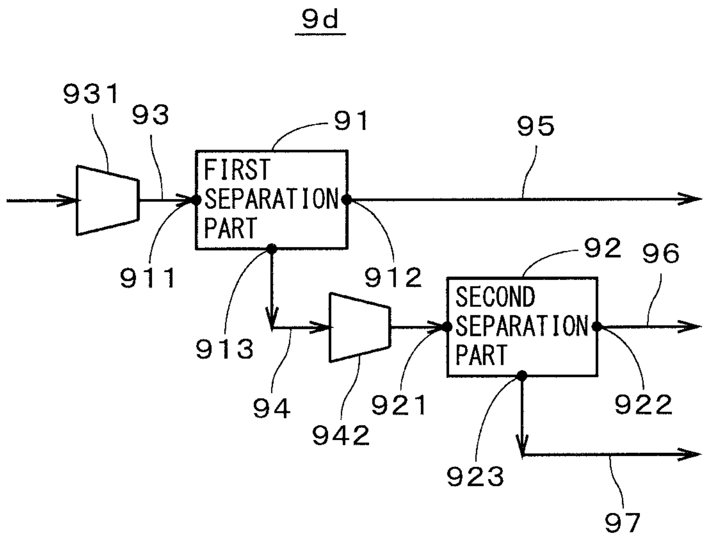
FIG. 6D is a view showing a configuration of a separation system in yet another Comparative Example.

The separation system 9*d* of Comparative Example 4 shown in FIG. 6D is provided with a first separation part 91 and a second separation part 92, and the permeate fluid exhaust port 913 of the first separation part 91 and a fluid supply port 921 of the second separation part 92 are connected to each other by an intermediate connecting part 94. The intermediate connecting part 94 is provided with a compressor 942. To the fluid supply port 911 of the first separation part 91, connected is the supply pipe 93, and the supply pipe 93 is provided with the compressor 931. To the non-permeate fluid exhaust port 912 of the first separation part 91, connected is a first non-permeate fluid collection pipe 95, and to a non-permeate fluid exhaust port 922 of the second separation part 92, connected is a second non-permeate fluid collection pipe 96. To a permeate fluid exhaust port 923 of the second separation part 92, connected is the permeate fluid collection pipe 97. The separation system 9*d* of Comparative Example 4 is different from the separation system 4 of Example in that the pressure reducing part 471 is omitted and the intermediate connecting part 94 is provided with the compressor 942.

In the separation systems 4 and 9*a* to 9*d* of Example and Comparative Examples 1 to 4, respectively, the same separation membrane module 2 (see FIG. 2) is used. Each of the separation membrane modules 2 has the separation membrane complex 1 having a diameter of 30 mm and a length of 160 mm. In the separation membrane complex 1, the DDR-type zeolite membrane 12 is provided. The permeance ratio of $CO_2/N_2$ of the zeolite membrane 12 is 27. The permeance ratio of $CO_2/N_2$ is a ratio in a case where a single-component cylinder gas is used as a supply gas and the pressure on the supply side is 300 kPaG, the pressure on the permeate side is the atmospheric pressure, and the temperature is 25° C.

In the separation systems 4 and 9*a* to 9*d* of Example and Comparative Examples 1 to 4, respectively, it is assumed that the pressure of the supply fluid is 800 kPaG. In the separation system 4 of Example, it is assumed that the pressure of the permeate fluid exhaust port 413 of the first separation part 41 is 0 kPaG and the pressure of the permeate fluid exhaust port 423 of the second separation part 42 is −100 kPaG. In the separation systems 9*a* and 9*b* of Comparative Examples 1 and 2, it is assumed that the pressure of the permeate fluid exhaust port 913 of the separation part 91 is 0 kPaG, and in the separation system 9*b*, it is assumed that the flow rate of the permeate fluid returned by the return pipe 98 is 2.3 $Nm^3/h$. In the separation system 9*c* of Comparative Example 3, it is assumed that the pressure of the permeate fluid exhaust port 913 of the separation part 91 is −100 kPaG. In the separation system 9*d* of Comparative Example 4, it is assumed that the pressure of the permeate fluid exhaust port 913 of the first separation part 91 is 0 kPaG, the pressure of the fluid supply port 921 of the second separation part 92 is 200 kPaG, and the pressure of the permeate fluid exhaust port 923 of the second separation part 92 is 0 kPaG.

In the separation test, the $CO_2$ concentration of the permeate fluid collected by the permeate fluid collection pipe 47 or 97 is evaluated. This is because it becomes important to increase the $CO_2$ concentration of the permeate fluid in order to extend the range of uses of the permeate fluid. The separation test is performed at 25° C., where the mixed fluid consisting of $CO_2$ of 15% (mol %, the same applies to the following) and $N_2$ of 85% is used as the supply fluid. The mixed fluid is generated by mixing a cylinder gas of $CO_2$ and a cylinder gas of $N_2$. The flow rate of the supply fluid is 30 $Nm^3/h$. Further, the test is performed by adjusting the number of separation membrane modules 2 used in each of the separation systems 4 and 9*a* to 9*d* (in other words, by adjusting the membrane surface area) so that the $CO_2$ collection rate of the permeate fluid to be collected by the permeate fluid collection pipe 47 or 97 may be 30%. Furthermore, the $CO_2$ collection rate is a percent obtained by dividing the amount of $CO_2$ in the permeate fluid in the permeate fluid collection pipe 47 or 97 by the amount of $CO_2$ in the supply fluid ((the amount of $CO_2$ in the permeate fluid/the amount of $CO_2$ in the supply fluid)×100). Table 1 shows a result of the separation test.

on the supply side of the separation part 91 and reducing the pressure on the permeate side thereof, but this is not sufficient. In the separation system 9*d* of Comparative Example 4, the $CO_2$ concentration of the permeate fluid is increased up to 90% by raising the pressure on the supply side of the first separation part 91 and also raising the pressure on the supply side of the second separation part 92, but the two compressors 931 and 942 are needed. Since the compressor is expensive, the manufacturing cost of the separation system 9*d* increases.

In contrast to this, in the separation system 4 of Example, the $CO_2$ concentration of the permeate fluid is significantly increased (up to 96%) by raising the pressure on the supply side of the first separation part 41 and reducing the pressure on the permeate side of the second separation part 42, and the separation accuracy can be improved. Since the number of expensive compressors (supply fluid pressure rising parts 431) to be needed is one, it is possible to suppress an increase in the manufacturing cost of the separation system 4. In comparison between the separation system 4 of Example and the separation system 9*d* of Comparative Example 4, in the separation system 9*d* of Comparative Example 4, it is necessary to raise the pressure of all the permeate fluids which have permeated the first separation part 91. On the other hand, in the separation system 4 of Example, since the pressure of only the second permeate fluid which has permeated the second separation part 42 among the first permeate fluid which has permeated the first separation part 41 is reduced, it is possible to reduce the consumption energy as compared with that in the separation system 9*d* of Comparative Example 4.

Like in the separation system 9*a* of Comparative Example 1, in order to increase the $CO_2$ concentration on the permeate side up to 96% in the case of raising the pressure on the

TABLE 1

| | | Structure of Separation System | Membrane Performance $CO_2/N_2$ Perm. Ratio | Permeate $CO_2$ Concentration [%] | $CO_2$ Collection Rate [%] |
|---|---|---|---|---|---|
| Comparative Example 1 | 1 Stage | Pressure Rising on Supply Side | 27 | 66 | 30 |
| Comparative Example 2 | 1 Stage | Pressure Rising on Supply Side Permeate Fluid Recycle | 27 | 70 | 30 |
| Comparative Example 3 | 1 Stage | Pressure Rising on Supply Side Pressure Reduction on Permeate Side | 27 | 80 | 30 |
| Comparative Example 4 | 2 Stages | First Separation Part: Pressure Rising on Supply Side Second Separation Part: Pressure Rising on Supply Side | 27 | 90 | 30 |
| Example | 2 Stages | First Separation Part: Pressure Rising on Supply Side Second Separation Part: Pressure Reduction on Permeate Side | 27 | 96 | 30 |
| Reference Example | 1 Stage | Pressure Rising on Supply Side | 1013 | 96 | 30 |

In the separation system 9*a* of Comparative Example 1, the $CO_2$ concentration of the permeate fluid in the permeate fluid collection pipe 97 is 66% and sufficient $CO_2$ concentration is not obtained. In the separation system 9*b* of Comparative Example 2, the $CO_2$ concentration of the permeate fluid is slightly increased (up to 70%) by returning half of the permeate fluid in the permeate fluid collection pipe 97 to the supply pipe 93, but sufficient $CO_2$ concentration is not still obtained. In the separation system 9*c* of Comparative Example 3, the $CO_2$ concentration of the permeate fluid is increased up to 80% by raising the pressure supply side of the separation part, according to calculations, a separation membrane having a permeance ratio of $CO_2/N_2$ of 1000 or more is needed. In Table 1, the permeance ratio and the like in this case are shown as Reference Example. In contrast to this, in the separation system 4 of Example, by using the separation membrane having a permeance ratio of $CO_2/N_2$ which is sufficiently lower than that of the separation membrane in Reference Example, it is possible to concentrate the $CO_2$ concentration of the permeate fluid to 96%.

As described above, the separation system 4 includes the first separation part 41 and the second separation part 42 each have the separation membrane (the zeolite membrane 12 in the above-described exemplary case). The intermediate connecting part 44 connects the permeate fluid exhaust port 413 of the first separation part 41 and the fluid supply port 421 of the second separation part 42 to each other. The supply pipe 43 is connected to the fluid supply port 411 of the first separation part 41, and the mixed fluid is thereby supplied at a pressure higher than the atmospheric pressure. To the permeate fluid exhaust port 423 of the second separation part 42, connected is the pressure reducing part 471 for reducing the pressure inside the permeate fluid exhaust port 423 to a pressure lower than the atmospheric pressure. In the separation system 4, the pressure inside the intermediate connecting part 44 is lower than the pressure inside the supply pipe 43 and is not lower than the atmospheric pressure. In the above-described separation system 4, it is possible to improve the separation accuracy by using a simple structure capable of suppressing the consumption energy. Further, since the intermediate connecting part 44 is not provided with any expensive component such as a compressor, a vacuum pump, or the like, it is possible to reduce the manufacturing cost of the separation system 4.

Figure 7A:
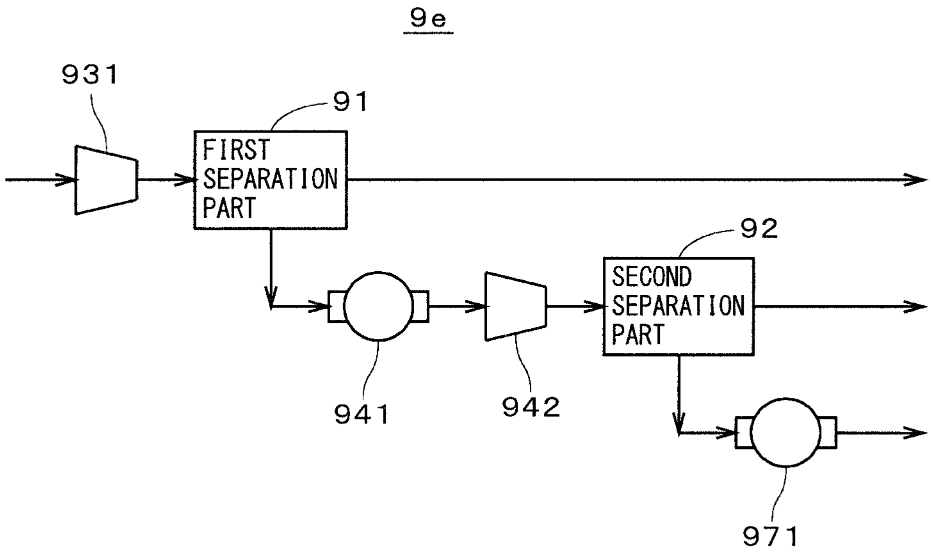
FIG. 7A is a view showing a configuration of a separation system in one other Comparative Example.
Figure 7B:
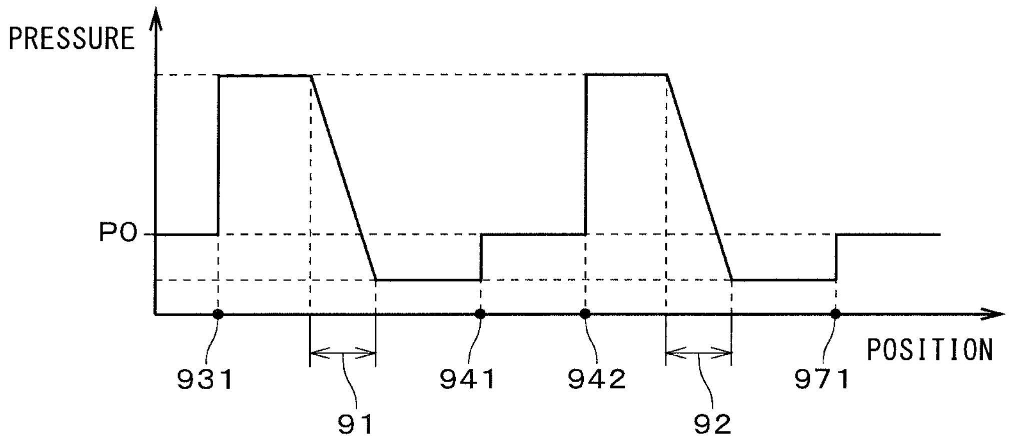
FIG. 7B is a graph showing a pressure at each position of the separation system in one other Comparative Example.

Herein, like in the separation system of FIG. 2 in Japanese Patent Application Laid Open Gazette No. 2008-137847 (the above-described Document 4), assumed is a separation system of one other Comparative Example in which each of the first separation part 91 and the second separation part 92 is provided with a compressor on the supply side and a vacuum pump on the permeate side. FIG. 7A is a view showing a configuration of a separation system 9*e* in one other Comparative Example. FIG. 7B is a graph showing a pressure at each position of the separation system 9*e* in one other Comparative Example, which corresponds to FIG. 5. On the horizontal axis of FIG. 7B, respective positions of the first separation part 91, the compressor 931 on the supply side of the first separation part 91, and the vacuum pump 941 on the permeate side thereof and respective positions of the second separation part 92, the compressor 942 on the supply side of the second separation part 92, and the vacuum pump 971 on the permeate side thereof are represented by the same reference signs as those of the corresponding constituent elements.

As shown in FIG. 7B, in the separation system 9*e*, on an upstream side and a downstream side of each of the separation parts 91 and 92, the compressor 931 or 942 and the vacuum pump 941 or 971 are provided, respectively, and a large pressure difference for each of the separation parts 91 and 92 is set. In contrast to this, in the separation system 4, as shown in FIG. 5, the supply fluid pressure rising part 431 is provided on an upstream side of the first separation part 41 and the pressure reducing part 471 is provided on a downstream side of the second separation part 42, and the pressure difference caused by the supply fluid pressure rising part 431 and the pressure reducing part 471 is shared among the first separation part 41 and the second separation part 42. Therefore, the separation system 4 is not a separation system in which the compressor 942 and the vacuum pump 941 between the first separation part 91 and the second separation part 92 are simply removed from the separation system 9*e*, but the separation system 4 and the separation system 9*e* have different technical ideas. As compared with the separation system 9*e*, the separation system 4 can adopt a simple and compact structure capable of suppressing the consumption energy.

In the separation system 9*e*, it is premised on using a polymer membrane (organic membrane) as the separation membrane. The polymer membrane has a permeance ratio lower than that of the zeolite membrane and a permeance of the permeate fluid which is lower than that of the zeolite membrane. Therefore, in order to both improve the separation accuracy and increase the permeance of the permeate fluid, it is necessary to set a large pressure difference for each of these separation parts by providing the compressor and the vacuum pump on the upstream side and the downstream side of each of the separation parts, respectively.

On the other hand, in each of the separation parts 41 and 42 of the separation system 4, preferably a separation membrane containing an inorganic material such as a zeolite membrane, a carbon membrane, a silica membrane, or the like is used, or more preferably the zeolite membrane 12 is used as the separation membrane. Such a separation membrane has a permeance ratio higher than that of the polymer membrane and a permeance of the permeate fluid which is higher than that of the polymer membrane. Therefore, it is easily possible to both improve the separation accuracy and increase the permeance of the permeate fluid without setting a large pressure difference for each separation part 41 or 42.

Depending on the design of the separation system 4, different types of separation membranes may be provided in the first separation part 41 and the second separation part 42. Preferably, the separation membrane of the first separation part 41 and/or the separation membrane of the second separation part 42 contain an inorganic material. More preferably, the separation membrane of the first separation part 41 and/or the separation membrane of the second separation part 42 are each the zeolite membrane 12. In a case where it is not necessary to increase the permeance of the permeate fluid or the like case, in the separation system 4, the polymer membrane (organic membrane) may be used. As the separation membrane, not only a membrane using molecular sieving but also a facilitated transport membrane may be used. In the separation system 4, even in a case of using a separation membrane having not high separation performance, such as the polymer membrane or the like, it is possible to attempt improvement of the separation accuracy.

In the case where the zeolite membrane 12 is used as the separation membrane, it is preferable that the mixed fluid should include a fluid having a molecular size smaller than the pore diameter of the zeolite forming the zeolite membrane 12 ($CO_2$ gas in the above-described exemplary case) and a fluid having a molecular size larger than the pore diameter thereof ($N_2$ gas in the above-described exemplary case). It is thereby possible to more reliably improve the separation accuracy.

Figure 8:
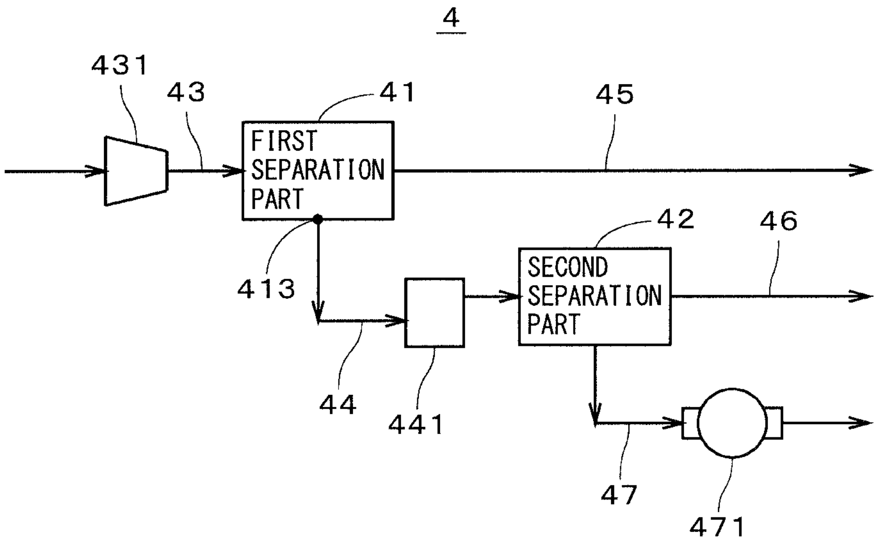
FIG. 8 is a view showing another example of the separation system.

FIG. 8 is a view showing another example of the separation system 4. The separation system 4 of FIG. 8 is different from the separation system 4 of FIG. 1 in that the intermediate connecting part 44 is provided with a fluid storage part 441. The constituent elements other than the above are identical to those in the separation system 4 of FIG. 1, and the same constituent elements are represented by the same reference signs (the same applies to FIGS. 9 to 15 described later).

The fluid storage part 441 is, for example, a buffer tank or the like, and can adjust a variation of the flow rate of the first permeate fluid and stabilize the performance of the second separation part 42. In the separation system 4 of FIG. 8, the pressure inside the intermediate connecting part 44 is substantially the same as the atmospheric pressure. Further, the intermediate connecting part 44 may be provided with a fan, a blowing machine, a blower, or the like not for pressure rising nor pressure reduction.

Herein, it can be thought that the intermediate connecting part 44 is provided with a compressor and the pressure of the first permeate fluid is thereby significantly raised, to thereby stabilize the performance of the second separation part 42. Since the compressor is expensive and the consumption energy is large, however, the manufacturing cost and the running cost of the separation system disadvantageously increase. Further, in the case where the intermediate connecting part 44 is provided with the compressor, depending on the temperature of the first permeate fluid which is increased due to pressure rising by the compressor, there is a possibility that an effect may be produced on the separation performance of the zeolite membrane 12 of the second separation part 42.

In contrast to this, in the separation system 4 of FIG. 8, since no compressor is used, it is possible to suppress an increase in the manufacturing cost and the running cost of the separation system 4.

Figure 9:
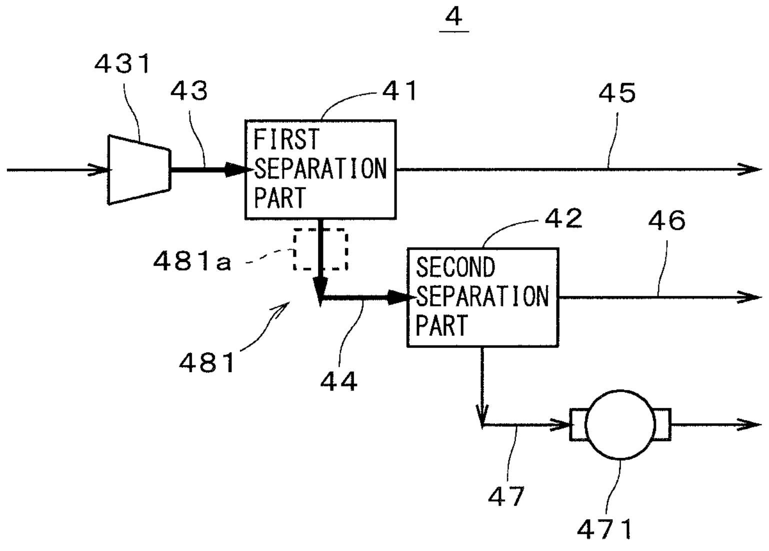
FIG. 9 is a view showing still another example of the separation system.

FIG. 9 is a view showing still another example of the separation system 4. The separation system 4 of FIG. 9 is different from the separation system 4 of FIG. 1 in that part of the supply pipe 43 and the intermediate connecting part 44 are covered with a thermal insulation material 481. In FIG. 9, by representing the part of the supply pipe 43 and the intermediate connecting part 44 by thick lines, it is shown that these are covered with the thermal insulation material 481. The constituent elements other than the above are identical to those in the separation system 4 of FIG. 1.

The thermal insulation material 481 is, for example, a fibrous thermal insulation material such as glass wool or the like or a foam thermal insulation material such as urethane foam or the like and suppresses a decrease in the temperature of the supply fluid supplied to the first separation part 41 (herein, the mixed gas) and that of the first permeate fluid exhausted from the first separation part 41. The thermal insulation material 481 is a condensation prevention part for keeping warm a gas flowing in the path from the supply pipe 43 to the second separation part 42, to thereby prevent condensation of the gas. The condensation prevention part can prevent a decrease in the permeability of the zeolite membrane 12 (particularly, the zeolite membrane 12 of the second separation part 42) due to condensation of the gas.

The thermal insulation material 481 does not necessarily need to cover both the supply pipe 43 and the intermediate connecting part 44, and has only to be provided at a predetermined position on the path from the supply pipe 43 to the separation membrane of the second separation part 42 (the zeolite membrane 12 in the above-described exemplary case). Further, the condensation prevention part may include a heating part, and also in this case, the heating part is provided at a predetermined position on the path from the supply pipe 43 to the separation membrane of the second separation part 42. In FIG. 9, the heating part 481*a* provided in the intermediate connecting part 44 is represented by a broken-line rectangle. The heating part 481*a* may be provided in the supply pipe 43 or may be provided inside the first separation part 41. Furthermore, the heating part 481*a* may be provided on an upstream side of the separation membrane inside the second separation part 42. In the case of providing the heating part 481*a*, the thermal insulation material 481 may be omitted. Thus, the condensation prevention part heats or keeps warm the gas flowing in the path from the supply pipe 43 to the separation membrane of the second separation part 42 and can thereby prevent condensation of the gas, and it is possible to prevent a decrease in the permeability of the separation membrane due to condensation of the gas.

Figure 10:
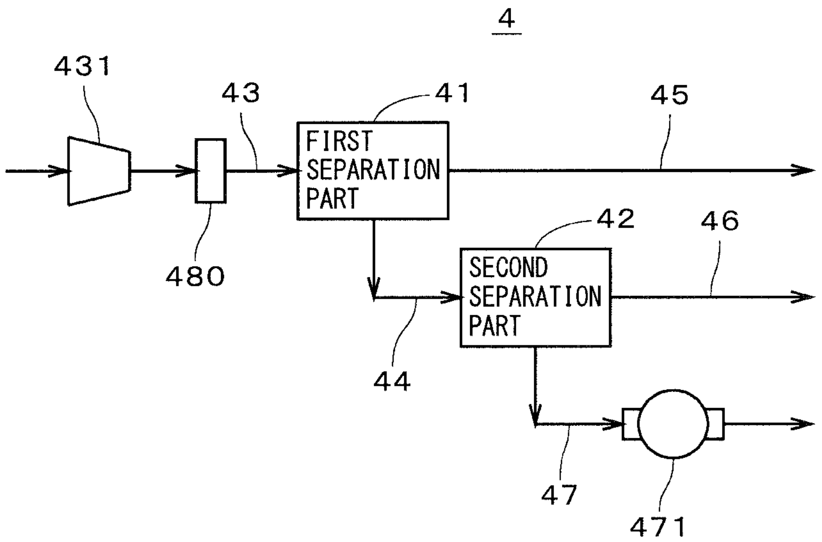
FIG. 10 is a view showing yet another example of the separation system.

FIG. 10 is a view showing yet another example of the separation system 4. The separation system 4 of FIG. 10 is different from the separation system 4 of FIG. 1 in that the supply pipe 43 is provided with a preprocessing part 480. The constituent elements other than the above are identical to those in the separation system 4 of FIG. 1.

The preprocessing part 480 is, for example, a filter, a washing tower, an absorption tower, an adsorption tower, a condenser, or the like, and removes at least part of a predetermined component from the mixed fluid flowing from the supply source of the mixed fluid toward the first separation part 41. The component to be removed is, for example, a component damaging the separation membrane (herein, the zeolite membrane 12) included in each of the separation parts 41 and 42 or a component affecting the permeability of the separation membrane, specifically, a solid content, a fine droplet, a condensed component, a slight amount of gas component, or the like. Further, the component to be removed may be the high permeability fluid or the low permeability fluid in the first separation part 41 and/or the second separation part 42. In the exemplary case shown in FIG. 10, the preprocessing part 480 is arranged between the supply fluid pressure rising part 431 and the first separation part 41. The preprocessing part 480 may be arranged between the supply source of the mixed fluid and the supply fluid pressure rising part 431, i.e., on an upstream side of the supply fluid pressure rising part 431.

Thus, in the separation system 4 of FIG. 10, the preprocessing part 480 is provided at a predetermined position between the supply source of the mixed fluid and the first separation part 41, and the preprocessing part 480 removes at least part of the predetermined component contained in the mixed fluid. It is thereby possible to suppress damaging of the separation membrane in the separation part 41 or 42 (particularly, the first separation part 41) and a decrease in the permeability due to, for example, the effect of the component contained in the mixed fluid.

Figure 11:
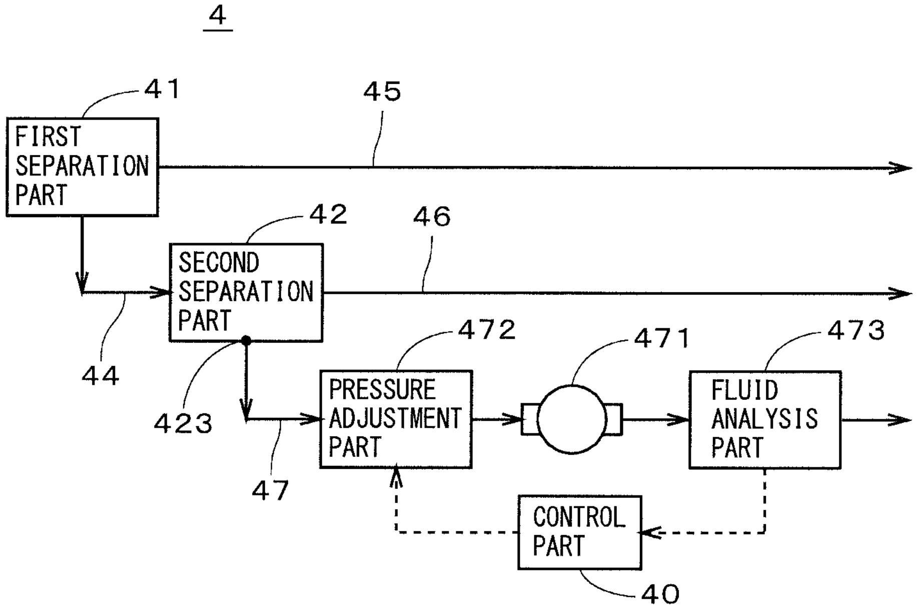
FIG. 11 is a view showing a further example of the separation system.

FIG. 11 is a view showing a further example of the separation system 4. The separation system 4 of FIG. 11 is different from the separation system 4 of FIG. 1 in that the permeate fluid collection pipe 47 is provided with a pressure adjustment part 472 and a fluid analysis part 473. The constituent elements other than the above are identical to those in the separation system 4 of FIG. 1.

The fluid analysis part 473 measures a component composition of the second permeate fluid exhausted from the permeate fluid exhaust port 423 of the second separation part 42. The pressure adjustment part 472 is, for example, a vacuum regulator or the like and adjusts the pressure inside the permeate fluid exhaust port 423 of the second separation part 42. Actually, the fluid analysis part 473 and the pressure adjustment part 472 are electrically connected to a control part 40, and a measurement result of the fluid analysis part 473 is outputted to the control part 40. To the control part 40, for example, a target range of the $CO_2$ concentration of the second permeate fluid is set in advance, and when the $CO_2$ concentration indicated by the measurement result of the fluid analysis part 473 is lower than the target range, the control part 40 controls the pressure adjustment part 472 to cause the pressure inside the permeate fluid exhaust port 423 to be lower than a current pressure. Further, when the $CO_2$ concentration indicated by the measurement result of the fluid analysis part 473 is higher than the target range, the control part 40 controls the pressure adjustment part 472 to cause the pressure inside the permeate fluid exhaust port 423 to be higher than the current pressure. Furthermore, the fluid analysis part 473 may be provided in the second non-permeate fluid collection pipe 46. Further, the pressure adjustment part 472 may be provided in the second non-permeate fluid collection pipe 46 and may be, for example, a back pressure valve or the like.

In the separation system 4 of FIG. 11, a flow measurement part (flowmeter) may be provided, instead of the fluid analysis part 473. The flow measurement part measures the flow rate of the second permeate fluid exhausted from the permeate fluid exhaust port 423 of the second separation part 42. To the control part 40, for example, a target range of the flow rate of the second permeate fluid is set in advance, and when the flow rate indicated by a measurement result of the flow measurement part is lower than the target range, the control part 40 controls the pressure adjustment part 472 to reduce the pressure inside the permeate fluid exhaust port 423 to be lower than the current pressure. Further, when the flow rate indicated by the measurement result of the flow measurement part is higher than the target range, the control part 40 controls the pressure adjustment part 472 to raise the pressure inside the permeate fluid exhaust port 423 to be higher than the current pressure. Furthermore, the flow measurement part may be provided in the second non-permeate fluid collection pipe 46. In the separation system 4, there may be a configuration where both the fluid analysis part 473 and the flow measurement part are provided and the pressure adjustment part 472 is controlled on the basis of the $CO_2$ concentration and the flow rate of the second permeate fluid.

Thus, in the pressure adjustment part 472, the pressure inside the permeate fluid exhaust port 423 of the second separation part 42 is adjusted on the basis of the flow rate and/or the component composition of the second permeate fluid or the second non-permeate fluid. It thereby becomes easily possible to cause the flow rate of the fluid exhausted from the permeate fluid collection pipe 47 and/or the concentration of the predetermined component ($CO_2$ in the above-described exemplary case) of the fluid to become substantially constant within the target range.

Figure 12:
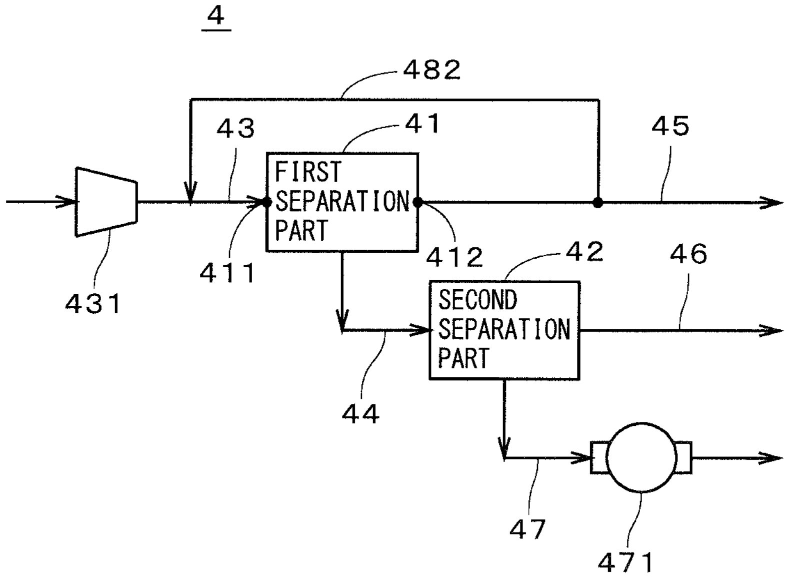
FIG. 12 is a view showing a still further example of the separation system.
Figure 13:
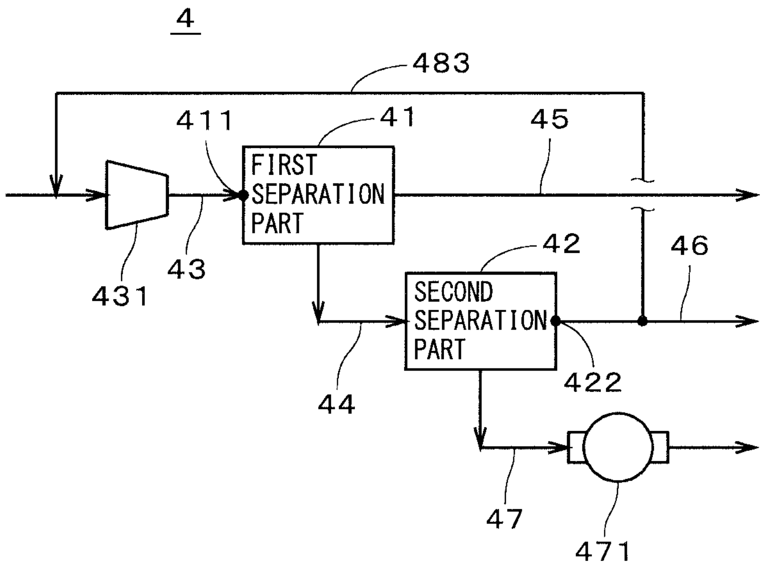
FIG. 13 is a view showing a yet further example of the separation system.

FIGS. 12 and 13 are views each showing a still further example of the separation system 4. The separation system 4 of FIG. 12 is different from the separation system 4 of FIG. 1 in that a return pipe 482 is provided, for connecting the first non-permeate fluid collection pipe 45 and a downstream side of the supply fluid pressure rising part 431 in the supply pipe 43 to each other. The separation system 4 of FIG. 13 is different from the separation system 4 of FIG. 1 in that a return pipe 483 is provided, for connecting the second non-permeate fluid collection pipe 46 and an upstream side of the supply fluid pressure rising part 431 in the supply pipe 43 to each other. The constituent elements in FIGS. 12 and 13 other than the above are identical to those in the separation system 4 of FIG. 1.

In the separation system 4 of FIG. 12, part of the first non-permeate fluid exhausted from the non-permeate fluid exhaust port 412 of the first separation part 41 is led to the fluid supply port 411 of the first separation part 41 by the return pipe 482. It is thereby possible to reduce the concentration of the predetermined component ($CO_2$ in the above-described exemplary case) in the fluid exhausted from the first non-permeate fluid collection pipe 45 and increase the concentration of the predetermined component in the second permeate fluid. Further, in the separation system 4 of FIG. 13, part of the second non-permeate fluid exhausted from the non-permeate fluid exhaust port 422 of the second separation part 42 is led to the fluid supply port 411 of the first separation part 41 by the return pipe 483. It is thereby possible to reduce the concentration of the predetermined component ($CO_2$ in the above-described exemplary case) in the fluid exhausted from the second non-permeate fluid collection pipe 46 and increase the concentration of the predetermined component in the second permeate fluid.

In the separation system 4 of FIG. 13, all the second non-permeate fluid may be led to the fluid supply port 411 of the first separation part 41 by the return pipe 483. Further, both the return pipes 482 and 483 may be provided. Thus, provided is the return pipe for leading part of the fluid exhausted from the non-permeate fluid exhaust port 412 of the first separation part 41 and/or at least part of the fluid exhausted from the non-permeate fluid exhaust port 422 of the second separation part 42 to the fluid supply port 411 of the first separation part 41. It is thereby possible to further increase the concentration of the predetermined component in the second permeate fluid.

Figure 14:
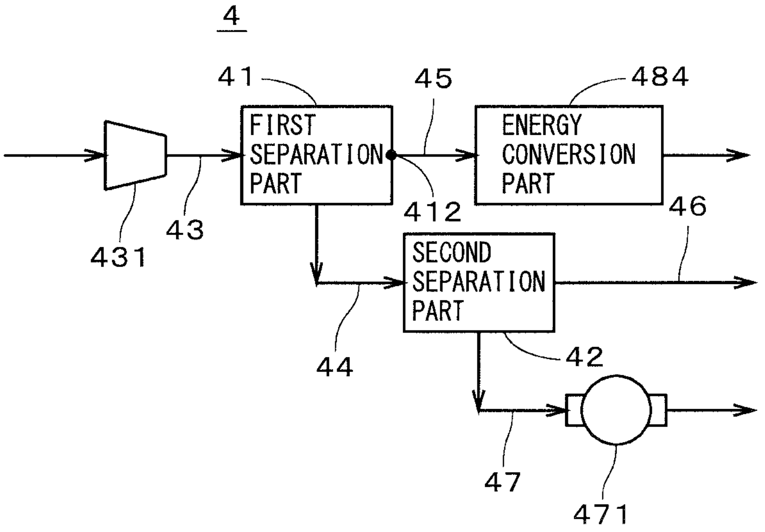
FIG. 14 is a view showing a further example of the separation system.

FIG. 14 is a view showing a further example of the separation system 4. The separation system 4 of FIG. 14 is different from the separation system 4 of FIG. 1 in that the first non-permeate fluid collection pipe 45 is provided with an energy conversion part 484. The constituent elements other than the above are identical to those in the separation system 4 of FIG. 1.

The energy conversion part 484 is, for example, a turbine or the like, and converts pressure energy of the first non-permeate fluid flowing in the first non-permeate fluid collection pipe 45 into different energy such as electrical energy, mechanical energy, or the like. The energy obtained by the energy conversion part 484 may be used by the supply fluid pressure rising part 431, the pressure reducing part 471, or the like. As described earlier, the first non-permeate fluid exhausted from the non-permeate fluid exhaust port 412 of the first separation part 41 has substantially the same pressure as that of the supply fluid whose pressure is raised by the supply fluid pressure rising part 431. As shown in FIG. 14, by providing the energy conversion part 484 for converting the pressure energy of the first non-permeate fluid into different energy, it becomes possible to efficiently use the energy in the separation system 4.

Figure 15:
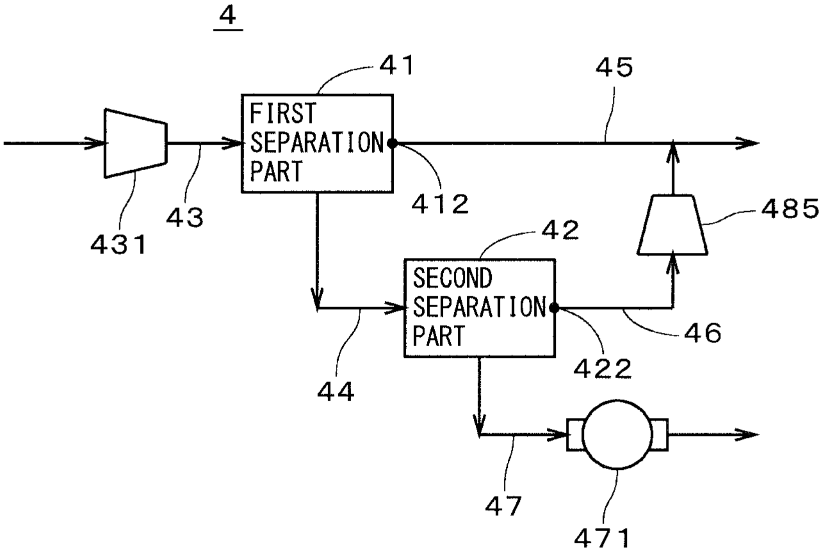
FIG. 15 is a view showing a still further example of the separation system.

FIG. 15 is a view showing a still further example of the separation system 4. The separation system 4 of FIG. 15 is different from the separation system 4 of FIG. 1 in that an end portion of the second non-permeate fluid collection pipe 46 opposite to the non-permeate fluid exhaust port 422 is connected to the first non-permeate fluid collection pipe 45 and the second non-permeate fluid collection pipe 46 is provided with an exhaust fluid pressure rising part 485. The constituent elements other than the above are identical to those in the separation system 4 of FIG. 1.

The exhaust fluid pressure rising part 485 is, for example, a compressor or the like, and raises a pressure of the second non-permeate fluid flowing in the second non-permeate fluid collection pipe 46. As described earlier, the second non-permeate fluid exhausted from the non-permeate fluid exhaust port 422 of the second separation part 42 has a pressure lower than that of the first non-permeate fluid exhausted from the non-permeate fluid exhaust port 412 of the first separation part 41. Therefore, the exhaust fluid pressure rising part 485 raises the pressure of the second non-permeate fluid and the second non-permeate fluid is mixed with the first non-permeate fluid, and it is thereby possible to obtain a large amount of high-pressure non-permeate fluid.

In the purification of the biogas having a main component of $CH_4$ and $CO_2$, it is necessary to increase the $CH_4$ concentration by removing $CO_2$. As described earlier, in the separation system 4, the $CO_2$ concentration in the permeate fluid (second permeate fluid) collected by the permeate fluid collection pipe 47 becomes high. Therefore, in the case where the biogas having a main component of $CH_4$ and $CO_2$ is used as the supply fluid, the $CH_4$ concentration becomes high in the non-permeate fluid collected by the first non-permeate fluid collection pipe 45 and the second non-permeate fluid collection pipe 46. In the separation system 4 of FIG. 15, in a case where the first non-permeate fluid which has passed through the first separation part 41 and has an increased $CH_4$ concentration is stored in a storage tank connected to the first non-permeate fluid collection pipe 45 while maintaining the pressure thereof, by raising the pressure of the second non-permeate fluid which has passed through the second separation part 42 and has an increased $CH_4$ concentration and mixing the second non-permeate fluid with the first non-permeate fluid, it is possible to store both the first non-permeate fluid and the second non-permeate fluid in the storage tank.

In the above-described separation system 4, various modifications can be made.

In the separation system 4, three or more stages of separation parts may be arranged. In this case, the separation part other than the first or second separation part 41 or 42 is arranged, for example, on an upstream side of the supply pipe 43.

In the first separation part 41, the plurality of separation membrane modules 2 may be connected in parallel. In this case, in M separation membrane modules 2 (M is an integer not smaller than 2) connected in parallel to one another, a group of M supply ports 221 serve as the fluid supply port 411, a group of M first exhaust ports 222 serve as the non-permeate fluid exhaust port 412, and a group of M second exhaust ports 223 serve as the permeate fluid exhaust port 413. The same applies to the second separation part 42.

In the intermediate connecting part 44, it is not necessary that all the first permeate fluid exhausted from the permeate fluid exhaust port 413 of the first separation part 41 is supplied to the fluid supply port 421 of the second separation part 42, and depending on the design of the separation system 4, only part of the first permeate fluid may be supplied to the fluid supply port 421. In this case, the first permeate fluid which is not supplied to the fluid supply port 421 may be returned to an upstream side of the supply fluid pressure rising part 431 of the supply pipe 43.

It is not necessary that the pressure inside the intermediate connecting part 44 (i.e., the pressure of the first permeate fluid) is the substantially atmospheric pressure, and the pressure inside the intermediate connecting part 44 may be a pressure which is sufficiently higher than the atmospheric pressure only if the pressure is lower than the pressure of the supply fluid.

Though part of the fluid supplied to the second separation part 42 permeates the zeolite membrane 12 and is led to the permeate side (permeate fluid exhaust port 423) by the pressure reducing operation of the pressure reducing part 471 in the above-described separation system 4, instead of the pressure reducing part 471, by carrying a sweep gas to the permeate side of the second separation part 42, it is also possible to construct the separation system of Reference Example which leads part of the fluid supplied to the second separation part 42 to the permeate side.

The maximum number of membered rings of the zeolite forming the zeolite membrane 12 may be any number other than 8. In the separation membrane complex 1, as described above, the zeolite membrane 12 may be formed of any one of various types of zeolites.

The zeolite membrane complex 1 may further include a function layer or a protective layer laminated on the zeolite membrane 12, additionally to the support 11 and the zeolite membrane 12. Such a function layer or a protective layer may be an inorganic membrane such as a zeolite membrane, a silica membrane, a carbon membrane, or the like or an organic membrane such as a polyimide membrane, a silicone membrane, or the like. Further, a substance that is easy to adsorb specific molecules such as $CO_2$ or the like may be added to the function layer or the protective layer laminated on the zeolite membrane 12.

In the first separation part 41 and/or the second separation part 42, the separation membrane module 2 may be a membrane reactor including a catalyst for further promoting a chemical reaction.

In the separation membrane complex 1, instead of the zeolite membrane 12, a separation membrane (for example, the above-described inorganic membrane or organic membrane) other than the zeolite membrane 12 may be formed on the support 11.

Though the case has been described where one type of high permeability fluid (e.g., $CO_2$) is concentrated and extracted as the second permeate fluid in the above-discussed preferred embodiment, in a case where the mixed fluid contains three or more types of components, two or more types of high permeability fluids may be concentrated and extracted. In other words, in the separation system 4, at least one type of high permeability fluid may be concentrated and extracted. Further, as described earlier, the separation system 4 may be used for the purpose of concentrating at least one type of low permeability fluid.

In the above-discussed preferred embodiment, though separation of gases (including vapors) is performed in the separation system 4, there may be a case where the supply fluid is a mixed liquid containing a plurality of types of liquids and liquid separation or pervaporation is performed.

In the above-described separation system 4, any substances other than the substances exemplarily shown in the above description may be separated from the mixed fluid.

The configurations in the above-discussed preferred embodiment and variations may be combined as appropriate only if those do not conflict with one another.

While the invention has been shown and described in detail, the foregoing description is in all aspects illustrative and not restrictive. It is therefore understood that numerous modifications and variations can be devised without departing from the scope of the invention.

INDUSTRIAL APPLICABILITY

The separation system of the present invention can be used for separation of various substances in various fields.

REFERENCE SIGNS LIST

4 Separation system
12 Zeolite membrane
41 First separation part
42 Second separation part
43 Supply pipe
44 Intermediate connecting part
411, 421 Fluid supply port
412, 422 Non-permeate fluid exhaust port
413, 423 Permeate fluid exhaust port
441 Fluid storage part
471 Pressure reducing part
472 Pressure adjustment part

480 Preprocessing part
481 Thermal insulation material
481*a* Heating part
482, 483 Return pipe
484 Energy conversion part
485 Exhaust fluid pressure rising part

The invention claimed is:

1. A separation system, comprising:

a first separation part having a separation membrane and provided with a fluid supply port, a permeate fluid exhaust port, and a non-permeate fluid exhaust port;

a second separation part having a separation membrane and provided with a fluid supply port, a permeate fluid exhaust port, and a non-permeate fluid exhaust port;

an intermediate connecting part for connecting said permeate fluid exhaust port of said first separation part and said fluid supply port of said second separation part;

a supply pipe connected to said fluid supply port of said first separation part, in which a mixed fluid containing a plurality of types of fluids flows at a pressure higher than an atmospheric pressure;

a pressure reducing part connected to said permeate fluid exhaust port of said second separation part, for reducing a pressure inside said permeate fluid exhaust port to a pressure lower than the atmospheric pressure, a flow measurement part and/or fluid analysis part, said flow measurement part measuring a flow rate of a fluid exhausted from said permeate fluid exhaust port or said non-permeate fluid exhaust port of said second separation part, said fluid analysis part measuring a component composition of said fluid exhausted from said permeate fluid exhaust port or said non-permeate fluid exhaust port of said second separation part;

a pressure adjustment part for adjusting a pressure inside said permeate fluid exhaust port of said second separation part; and a control part for controlling said pressure adjustment part so that a flow rate obtained by said flow measurement part and/or concentration of a predetermined component obtained by said fluid analysis part falls within a predetermined range;

wherein said intermediate connecting part is not provided with any device for pressure rising nor any device for pressure reduction, and a pressure inside said intermediate connecting part is lower than a pressure inside said supply pipe and not lower than the atmospheric pressure.

2. The separation system according to claim 1, wherein a pressure difference between said fluid supply port and said permeate fluid exhaust port in said second separation part is not higher than 0.8 times said pressure difference in said first separation part.

3. The separation system according to claim 1, wherein said mixed fluid is a mixed gas containing a plurality of types of gases.

4. The separation system according to claim 3, further comprising:

a condensation prevention part provided at a predetermined position on a path from said supply pipe to said separation membrane of said second separation part, for heating or keeping warm a gas flowing in said path, to thereby prevent condensation of said gas.

5. The separation system according to claim 1, further comprising:

a preprocessing part provided at a predetermined position between a supply source of said mixed fluid and said first separation part, for removing at least part of a predetermined component contained in said mixed fluid.

6. The separation system according to claim 1, wherein said separation membrane of said first separation part and/or said separation membrane of said second separation part each contain an inorganic material.

7. The separation system according to claim 1, wherein said separation membrane of said first separation part and/or said separation membrane of said second separation part are each a zeolite membrane.

8. The separation system according to claim 7, wherein said mixed fluid contains a fluid having a molecular size smaller than a pore diameter of zeolite forming said zeolite membrane and a fluid having a molecular size larger than said pore diameter.

9. The separation system according to claim 7, wherein a zeolite forming said zeolite membrane is an eight-membered ring zeolite.

10. The separation system according to claim 1, wherein said pressure adjustment part is provided between said permeate fluid exhaust port of said second separation part and said pressure reducing part in a permeate fluid collection pipe connected to said permeate fluid exhaust port of said second separation part.

11. The separation system according to claim 1, further comprising:

a return pipe for leading part of a fluid exhausted from said non-permeate fluid exhaust port of said first separation part and/or at least part of a fluid exhausted from said non-permeate fluid exhaust port of said second separation part to said fluid supply port of said first separation part.

12. The separation system according to claim 1, further comprising:

an energy conversion part for converting pressure energy of a fluid exhausted from said non-permeate fluid exhaust port of said first separation part into different energy.

13. The separation system according to claim 1, further comprising:

an exhaust fluid pressure rising part for raising a pressure of a fluid exhausted from said non-permeate fluid exhaust port of said second separation part, wherein the fluid whose pressure is raised by said exhaust fluid pressure rising part is mixed with a fluid exhausted from said non-permeate fluid exhaust port of said first separation part.

* * * * *